US012323857B2

(12) United States Patent
Sun et al.

(10) Patent No.: US 12,323,857 B2
(45) Date of Patent: *Jun. 3, 2025

(54) ENHANCED BANDWIDTH NEGOTIATION

(71) Applicant: QUALCOMM Incorporated, San Diego, CA (US)

(72) Inventors: Yanjun Sun, San Diego, CA (US); Alfred Asterjadhi, San Diego, CA (US); George Cherian, San Diego, CA (US); Abhishek Pramod Patil, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,989

(22) Filed: Apr. 26, 2024

(65) Prior Publication Data

US 2024/0349126 A1 Oct. 17, 2024

Related U.S. Application Data

(63) Continuation of application No. 17/396,091, filed on Aug. 6, 2021, now Pat. No. 11,997,541.

(Continued)

(51) Int. Cl.
H04W 28/20 (2009.01)
H04W 80/00 (2009.01)

(52) U.S. Cl.
CPC ........... *H04W 28/20* (2013.01); *H04W 80/00* (2013.01)

(58) Field of Classification Search
None
See application file for complete search history.

(56) References Cited

U.S. PATENT DOCUMENTS 4,099,027 A * 7/1978 Whitten .................... H04K 1/06
327/284
8,634,361 B2 * 1/2014 Womack ............... H04L 5/0048
370/328

(Continued)

FOREIGN PATENT DOCUMENTS

GB 2538099 A 11/2016
KR 20160056287 A 5/2016

(Continued)

OTHER PUBLICATIONS

International Preliminary Report on Patentability—PCT/US2021/045182—The International Bureau of WIPO—Geneva, Switzerland—Feb. 23, 2023-02-23.

(Continued)

*Primary Examiner* — Hassan A Phillips
*Assistant Examiner* — Gautam Sharma
(74) *Attorney, Agent, or Firm* — Holland & Hart LLP

(57) ABSTRACT

This disclosure provides methods, devices and systems for enhanced bandwidth negotiation. Some implementations more specifically relate to request-to-transmit (RTS) and clear-to-send (CTS) frame designs that support bandwidth negotiations over a range of bandwidths achievable in accordance with the IEEE 802.11be amendment, and future generations, of the IEEE 802.11 standard. In some implementations, a bandwidth negotiation frame (such as a CTS or RTS frame) may be configurable to support bandwidths greater than 160 MHz. In some aspects, the bandwidth negotiation frame may conform to a legacy control frame format. More specifically, one or more bits of a service field associated with the legacy control frame format may be repurposed to carry enhanced bandwidth information. In some aspects, a recipient of a bandwidth negotiation frame may interpret one or more bits of the service field to carry (Continued)

enhanced bandwidth information when the frame is transmitted by a non-legacy transmitting device.

20 Claims, 14 Drawing Sheets

Related U.S. Application Data

(60) Provisional application No. 63/069,957, filed on Aug. 25, 2020, provisional application No. 63/064,323, filed on Aug. 11, 2020.

(56) References Cited

U.S. PATENT DOCUMENTS

| | | | |
|---|---|---|---|
| 11,997,541 B2* | 5/2024 | Sun | H04W 80/00 |
| 2006/0041576 A1* | 2/2006 | Ito | H04L 25/03866 |
| | | | 707/999.102 |
| 2012/0082040 A1* | 4/2012 | Gong | H04L 5/0062 |
| | | | 370/252 |
| 2014/0086200 A1 | 3/2014 | Seok | |
| 2015/0373587 A1* | 12/2015 | Josiam | H04W 28/20 |
| | | | 370/338 |
| 2016/0014725 A1* | 1/2016 | Yu | H04W 72/0453 |
| | | | 370/329 |
| 2016/0157266 A1 | 6/2016 | Wang et al. | |
| 2016/0316455 A1 | 10/2016 | Asterjadhi et al. | |
| 2017/0332277 A1 | 11/2017 | Xin et al. | |
| 2019/0191414 A1* | 6/2019 | Bang | H04W 84/12 |
| 2020/0162963 A1* | 5/2020 | Alpert | H04L 1/06 |
| 2021/0336720 A1* | 10/2021 | Chu | H04W 28/20 |
| 2021/0345403 A1* | 11/2021 | Kneckt | H04L 1/16 |
| 2022/0030572 A1* | 1/2022 | Shellhammer | H04B 7/0697 |
| 2022/0053379 A1* | 2/2022 | Sun | H04W 28/20 |
| 2023/0189065 A1* | 6/2023 | Alpert | H04W 28/06 |
| | | | 370/230 |

FOREIGN PATENT DOCUMENTS

| | | |
|---|---|---|
| TW | 201306542 A | 2/2013 |
| TW | 201810983 A | 3/2018 |
| WO | WO-2019032216 A1 | 2/2019 |

OTHER PUBLICATIONS

International Search Report and Written Opinion—PCT/US2021/045182—ISA/EPO—Nov. 30, 2021.
Taiwan Search Report—TW110129275—TIPO—Dec. 21, 2024.

* cited by examiner

ENHANCED BANDWIDTH NEGOTIATION

CROSS-REFERENCE TO RELATED APPLICATIONS

This Patent Application is a continuation of U.S. Non-Provisional patent application Ser. No. 17/396,091 entitled "ENHANCED BANDWIDTH NEGOTIATION" and filed on Aug. 6, 2021, which claims priority to U.S. Provisional Patent Application No. 63/064,323 entitled "ENHANCED BANDWIDTH NEGOTIATION" and filed on Aug. 11, 2020, and to U.S. Provisional Patent Application No. 63/069,957 entitled "ENHANCED BANDWIDTH NEGOTIATION" and filed on Aug. 25, 2020, all of which are assigned to the assignee hereof. The disclosures of all prior Applications are considered part of and are incorporated by reference in this Patent Application.

TECHNICAL FIELD

This disclosure relates generally to wireless communication, and more specifically to enhanced bandwidth negotiation techniques for wireless communications.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

To prevent collisions in a BSS, only one wireless communication device (such as an AP or a STA) may access the shared wireless communication medium at a time. In some BSSs, wireless communication devices may compete for access to the wireless medium. For example, the devices may use carrier sense multiple access collision avoidance (CSMA/CA) techniques to "listen" to the wireless medium to determine when the wireless medium is idle. When the wireless medium has been idle for a given duration, the devices may contend for medium access, for example, by waiting a "back-off" period before attempting to transmit on the wireless medium. The winning device may be granted exclusive access to the wireless medium for a period of time commonly referred to as a transmit opportunity (TXOP). In some BSSs, two (or more) STAs may be within range of communicating with the AP but not with one another. In other words, one of the STAs may be unable to detect when the other STA is transmitting on the wireless medium, resulting in a "hidden node" problem.

To avoid the hidden node problem, some BSSs may require wireless communication devices to explicitly announce their intent to access the wireless medium. For example, a STA may transmit a request-to-send (RTS) frame to an AP when it has uplink data to transmit. The RTS frame may indicate a desired bandwidth to be used for the uplink transmission. If some or all of the desired bandwidth is available for use by the requesting STA, the AP may transmit a clear-to-send (CTS) frame granting medium access to the STA. The CTS frame may indicate the available spectrum that can be used for uplink transmissions by the requesting STA. In this manner, a STA may transmit on the wireless medium only after being explicitly granted access by the AP and may utilize only the available spectrum indicated by the CTS frame.

New WLAN communication protocols are being developed to enable enhanced WLAN communication features such as, for example, increases in the bandwidth of communications. As new WLAN communication protocols enable enhanced features, new RTS and CTS frame designs are needed to support bandwidth negotiations over a greater range of bandwidths.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a first physical layer convergence protocol (PLCP) protocol data unit (PPDU) including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU; and selectively transmitting a second PPDU based on the bandwidth information carried in the service field of the first PPDU.

In some aspects, the at least three bits carrying the bandwidth information may include two of the scrambler initialization bits and a first bit of the service field following the sequence of scrambler initialization bits. In some implementations, the two scrambler initialization bits may be located in the sixth and seventh bit positions of the service field and the first bit following the sequence of scrambler initialization bits may be located in the eighth bit position of the service field. In some implementations, the first bit following the sequence of scrambler initialization bits may be set to a value equal to 1. In some implementations, each of the two scrambler initialization bits may be set to a value equal to 0.

In some implementations, the bandwidth information may indicate that the bandwidth associated with the first PPDU is equal to 320 MHz. In some implementations, the service field may further include a second bit, following the sequence of scrambler initialization bits, that carries parity check information associated with the service field.

In some implementations, the selective transmitting of the second PPDU may include transmitting the second PPDU responsive to receiving the first PPDU, where the second PPDU has a bandwidth that is less than or equal to the bandwidth associated with the first PPDU. In some implementations, the first PPDU may be a request-to-send (RTS) frame and the second PPDU may be a clear-to-send (CTS) frame. In some other implementations, the first PPDU may be a CTS frame and the second PPDU may be a data frame.

In some aspects, the at least three bits carrying the bandwidth information may include three of the scrambler initialization bits. In some implementations, a transmitter address (TA) field of the first PPDU may include a respective individual/group bit set to a value equal to 1 and a receiver address (RA) field of the first PPDU may include a respective individual/group bit set to a value equal to 1.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including receiving a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU; and selectively transmitting a second PPDU based on the bandwidth information carried in the service field of the first PPDU.

Another innovative aspect of the subject matter described in this disclosure can be implemented as a method of wireless communication. The method may be performed by a wireless communication device, and may include transmitting a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU; and receiving a second PPDU having a bandwidth associated with the bandwidth information carried in the service field of the first PPDU.

In some aspects, the at least three bits carrying the bandwidth information may include two of the scrambler initialization bits and a first bit of the service field following the sequence of scrambler initialization bits. In some implementations, the two scrambler initialization bits may be located in the sixth and seventh bit positions of the service field and the first bit following the sequence of scrambler initialization bits may be located in the eighth bit position of the service field. In some implementations, the first bit following the sequence of scrambler initialization bits may be set to a value equal to 1. In some implementations, each of the two scrambler initialization bits may be set to a value equal to 0.

In some implementations, the bandwidth information may indicate that the bandwidth associated with the first PPDU is equal to 320 MHz. In some implementations, the service field may further include a second bit, following the sequence of scrambler initialization bits, that carries parity check information associated with the service field.

In some implementations, the bandwidth of the second PPDU may be less than or equal to the bandwidth associated with the first PPDU. In some implementations, the first PPDU may be an RTS frame and the second PPDU may be a CTS frame. In some other implementations, the first PPDU may be a CTS frame and the second PPDU is a data frame.

In some aspects, the at least three bits carrying the bandwidth information may include three of the scrambler initialization bits. In some implementations, a TA field of the first PPDU may include a respective individual/group bit set to a value equal to 1 and an RA field of the first PPDU may include a respective individual/group bit set to a value equal to 1.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including transmitting a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU; and receiving a second PPDU having a bandwidth associated with the bandwidth information carried in the service field of the first PPDU.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
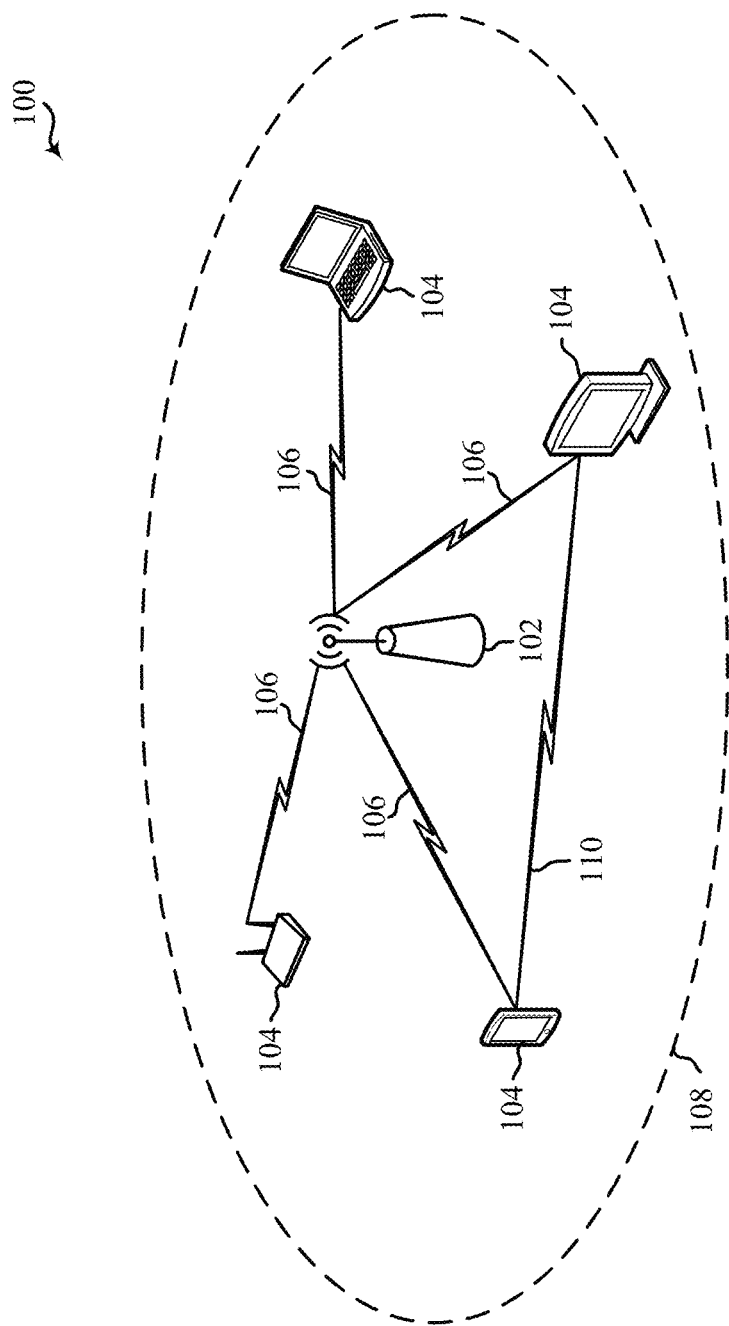
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Various aspects relate generally to control frames in wireless communications, and more particularly, to control frame designs that support bandwidth negotiations over a range of bandwidths achievable in accordance with the IEEE 802.11be amendment, and future generations, of the IEEE 802.11 standard. In some aspects, a bandwidth negotiation frame may carry enhanced bandwidth information that can be used to signal bandwidths greater than 160 MHz. As used herein, the term "bandwidth negotiation frame" may refer to any control frame usable for bandwidth negotiations between a requesting device and a responding device. Example suitable bandwidth negotiation frames include request-to-transmit (RTS) frames and clear-to-send (CTS) frames, among other examples. In some implementations, the bandwidth negotiation frame may be formatted in accordance with a legacy control frame format. More specifically, one or more bits of a service field associated with the legacy control frame format may be repurposed to carry the enhanced bandwidth information. As used herein, the term "legacy" may refer to frame formats and communication protocols conforming to the IEEE 802.11ax amendment, and earlier generations, of the IEEE 802.11 standard. In contrast, the term "non-legacy" may refer to frame formats and communication protocols conforming to the IEEE 802.11be amendment, and future generations, of the IEEE 802.11 standard.

Particular implementations of the subject matter described in this disclosure can be implemented to realize one or more of the following potential advantages. By repurposing one or more bits of the service field to carry enhanced bandwidth information, the bandwidth negotiation frames of the present disclosure support gains in data throughput achievable in accordance with the IEEE 802.11be amendment, and future generations, of the IEEE 802.11 standard. Among other examples, the enhanced bandwidth information may be used to negotiate bandwidths up to at least 320 MHz for the transmission of subsequent data frames. By configuring the enhanced bandwidth information to conform with the legacy control frame format, the bandwidth negotiation frames of the present implementations may support enhanced communication features usable by non-legacy wireless communication devices while maintaining backwards compatibility with legacy wireless communication devices. For example, the IEEE 802.11ax amendment of the IEEE 802.11 amendment supports repurposing 2 bits of the service field bits of an RTS or CTS frame to provide bandwidth indications of up to 160 MHz. Aspects of the present disclosure may supplement these 2 service field bits with enhanced bandwidth information to extend the bandwidth indications up to at least 320 MHz.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Figure 2A:
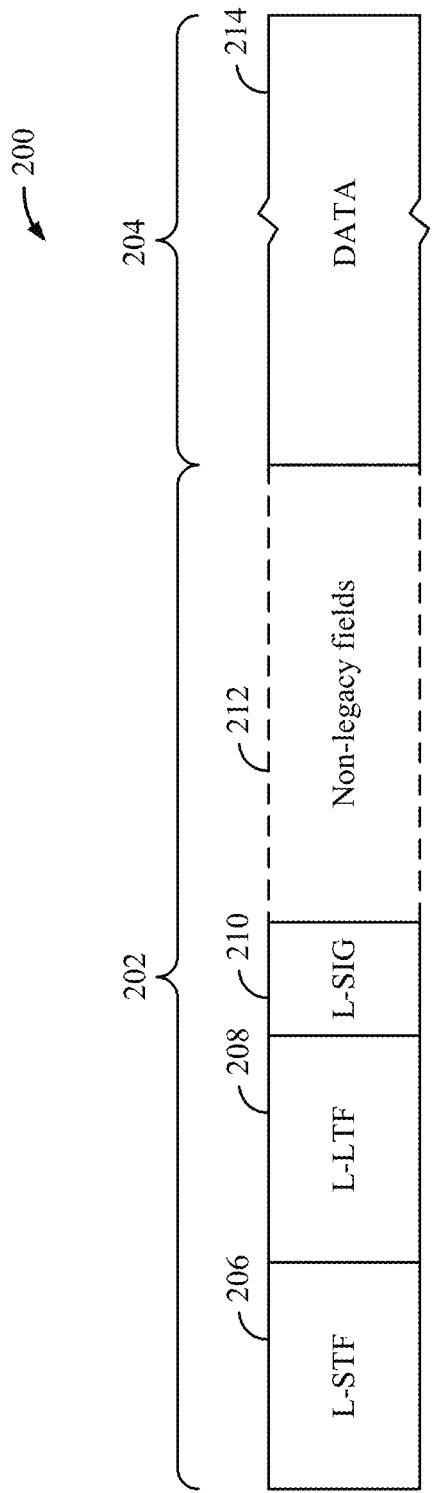
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. In some implementations, the preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
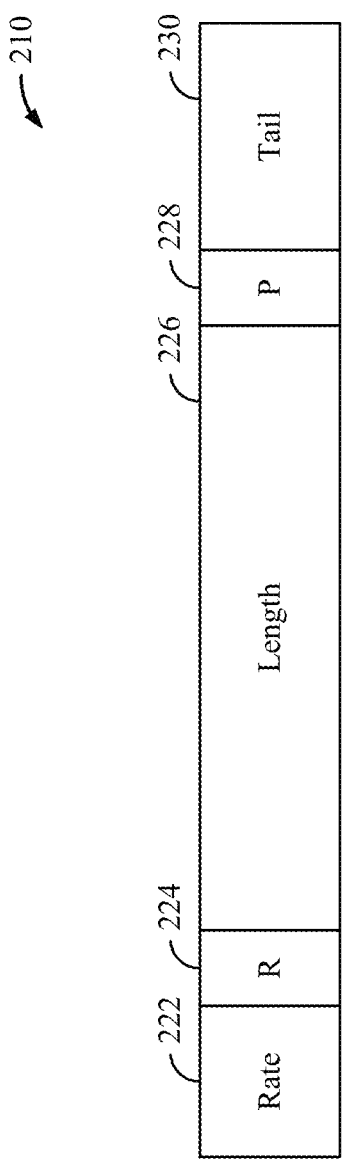
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
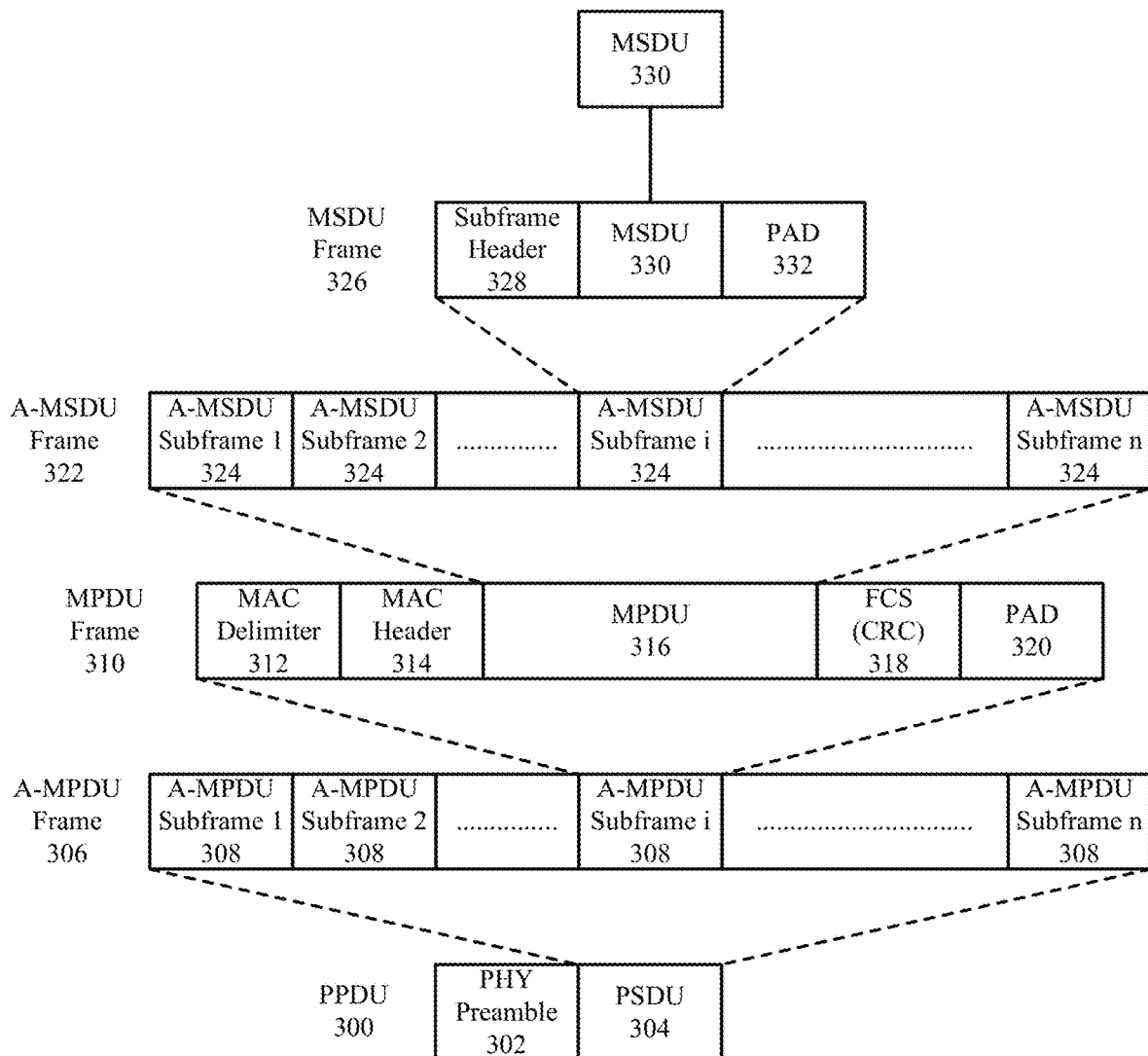
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 316. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
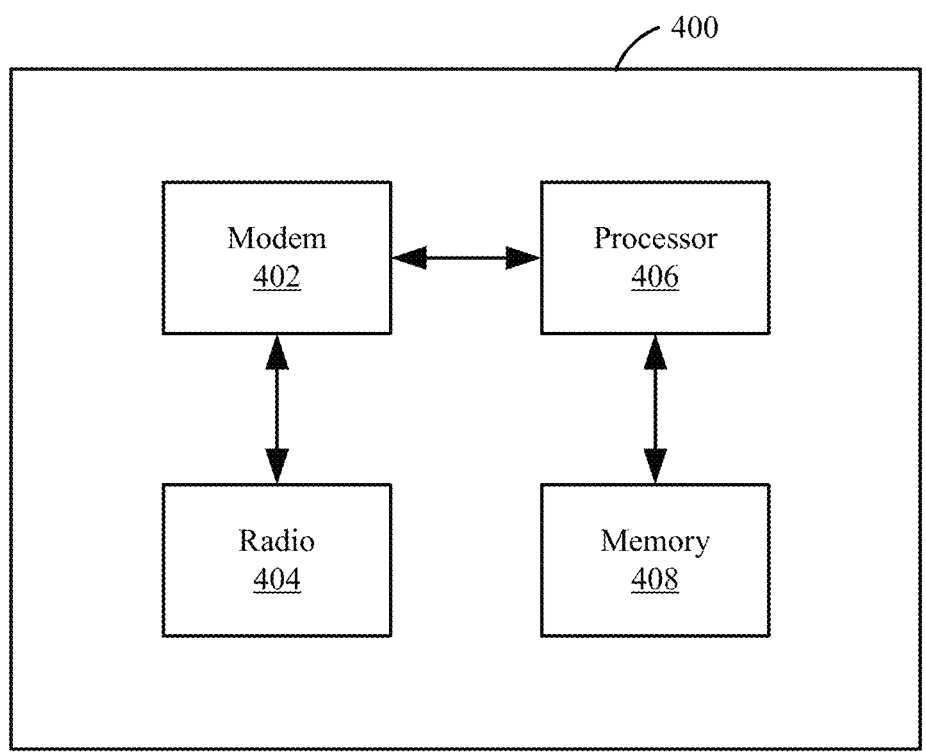
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number NsTs of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 404 can include tangible storage media such as random-access memory (RAM) or read-only memory (ROM), or combinations thereof. The memory 404 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
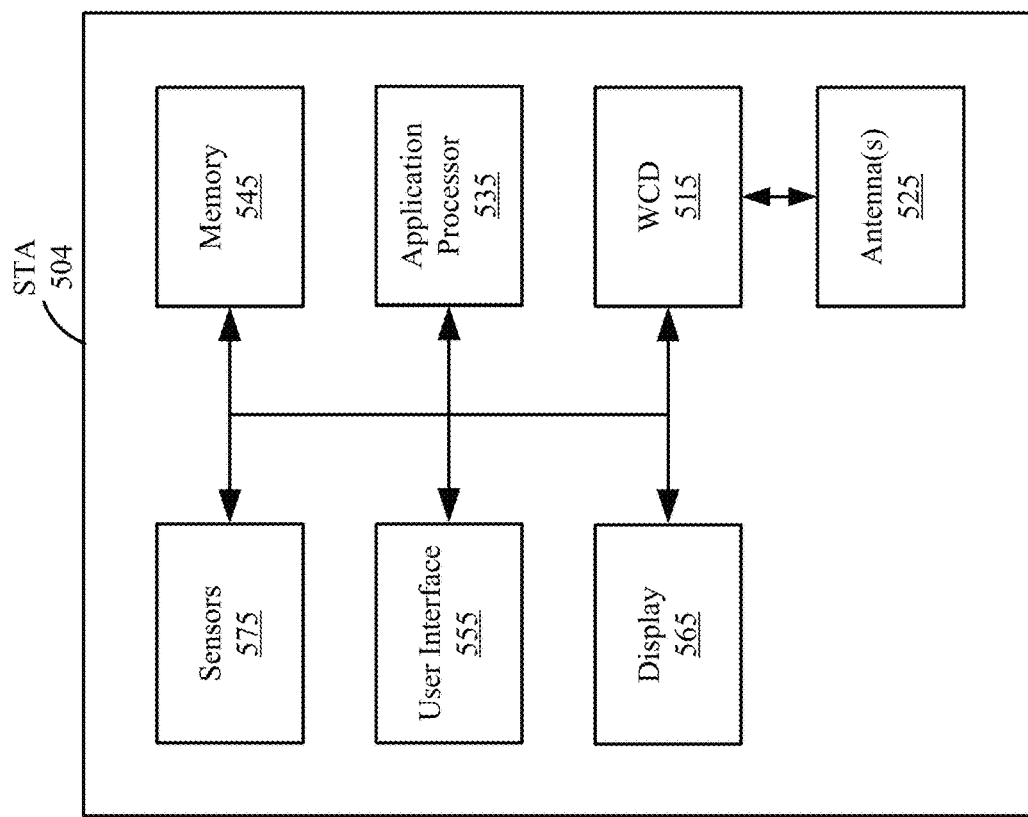
FIG. 5B shows a block diagram of an example STA.
Figure 5A:
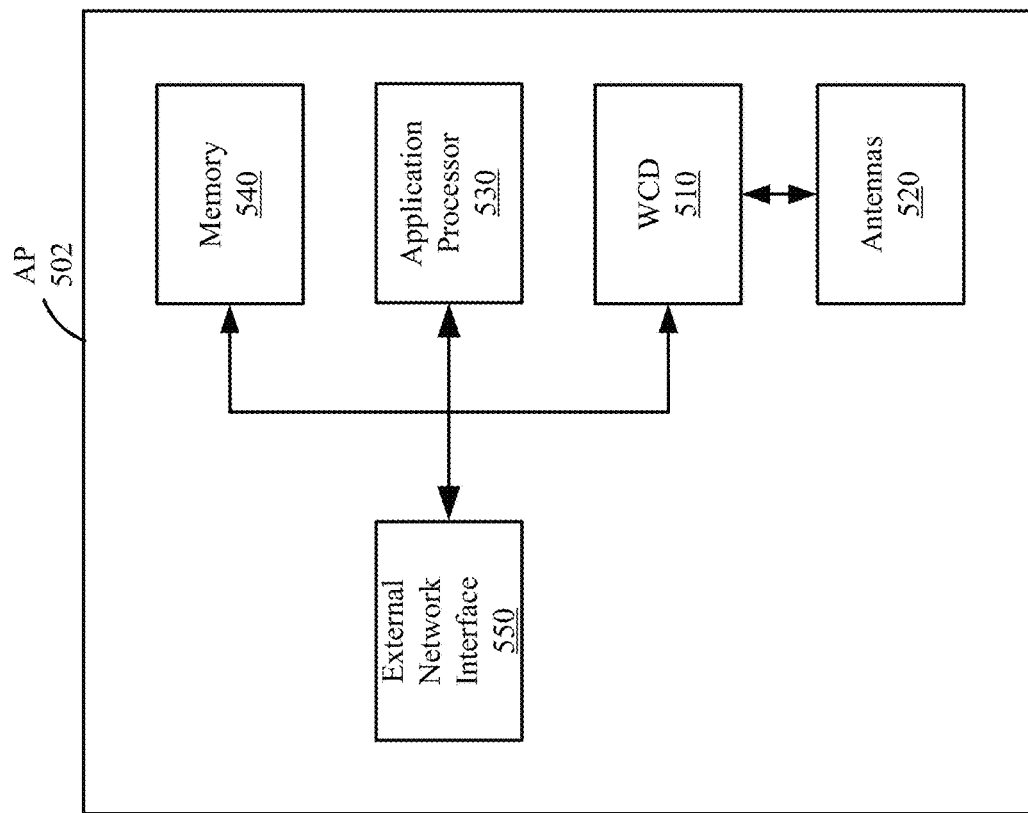
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, some BSSs may require wireless communication devices to explicitly announce their intent to access the wireless medium. For example, a STA may transmit an RTS frame to an AP when it has uplink data to transmit. The RTS frame may indicate a desired bandwidth to be used for the uplink transmission. If some or all of the desired bandwidth is available for use by the requesting STA, the AP may transmit a CTS frame granting medium access to the STA. The CTS frame may indicate the available spectrum that can be used for uplink transmissions by the requesting STA. In this manner, a STA may transmit on the wireless medium only after being explicitly granted access by the AP and may utilize only the available spectrum indicated by the CTS frame. As new WLAN communication protocols enable enhanced features, new RTS and CTS frame designs are needed to support bandwidth negotiations over a greater range of bandwidths.

Various aspects relate generally to control frames in wireless communications, and more particularly, to control frame designs that support bandwidth negotiations over a range of bandwidths achievable in accordance with the IEEE 802.11be amendment, and future generations, of the IEEE 802.11 standard. In some aspects, a bandwidth negotiation frame may carry enhanced bandwidth information that can be used to signal bandwidths greater than 160 MHz. As used herein, the term "bandwidth negotiation frame" may refer to any control frame usable for bandwidth negotiations between a requesting device and a responding device. Example suitable bandwidth negotiation frames include RTS frames and CTS frames, among other examples. In some implementations, the bandwidth negotiation frame may be formatted in accordance with a legacy control frame format. More specifically, one or more bits of a service field associated with the legacy control frame format may be repurposed to carry the enhanced bandwidth information. As used herein, the term "legacy" may refer to frame formats and communication protocols conforming to the IEEE 802.11ax amendment, and earlier generations, of the IEEE 802.11 standard. In contrast, the term "non-legacy" may refer to frame formats and communication protocols conforming to the IEEE 802.11be amendment, and future generations, of the IEEE 802.11 standard.

Particular implementations of the subject matter described in this disclosure can be implemented to realize one or more of the following potential advantages. By repurposing one or more bits of the service field to carry enhanced bandwidth information, the bandwidth negotiation frames of the present disclosure support gains in data throughput achievable in accordance with the IEEE 802.11be amendment, and future generations, of the IEEE 802.11 standard. Among other examples, the enhanced bandwidth information may be used to negotiate bandwidths up to at least 320 MHz for the transmission of subsequent data frames. By configuring the enhanced bandwidth information to conform with the legacy control frame format, the bandwidth negotiation frames of the present implementations may support enhanced communication features usable by non-legacy wireless communication devices while maintaining backwards compatibility with legacy wireless communication devices. For example, the IEEE 802.11ax amendment of the IEEE 802.11 amendment supports repurposing 2 bits of the service field of an RTS or CTS frame to provide bandwidth indications of up to 160 MHz. Aspects of the present disclosure may supplement these 2 service field bits with enhanced bandwidth information to extend the bandwidth indications up to at least 320 MHZ.

Figure 6:
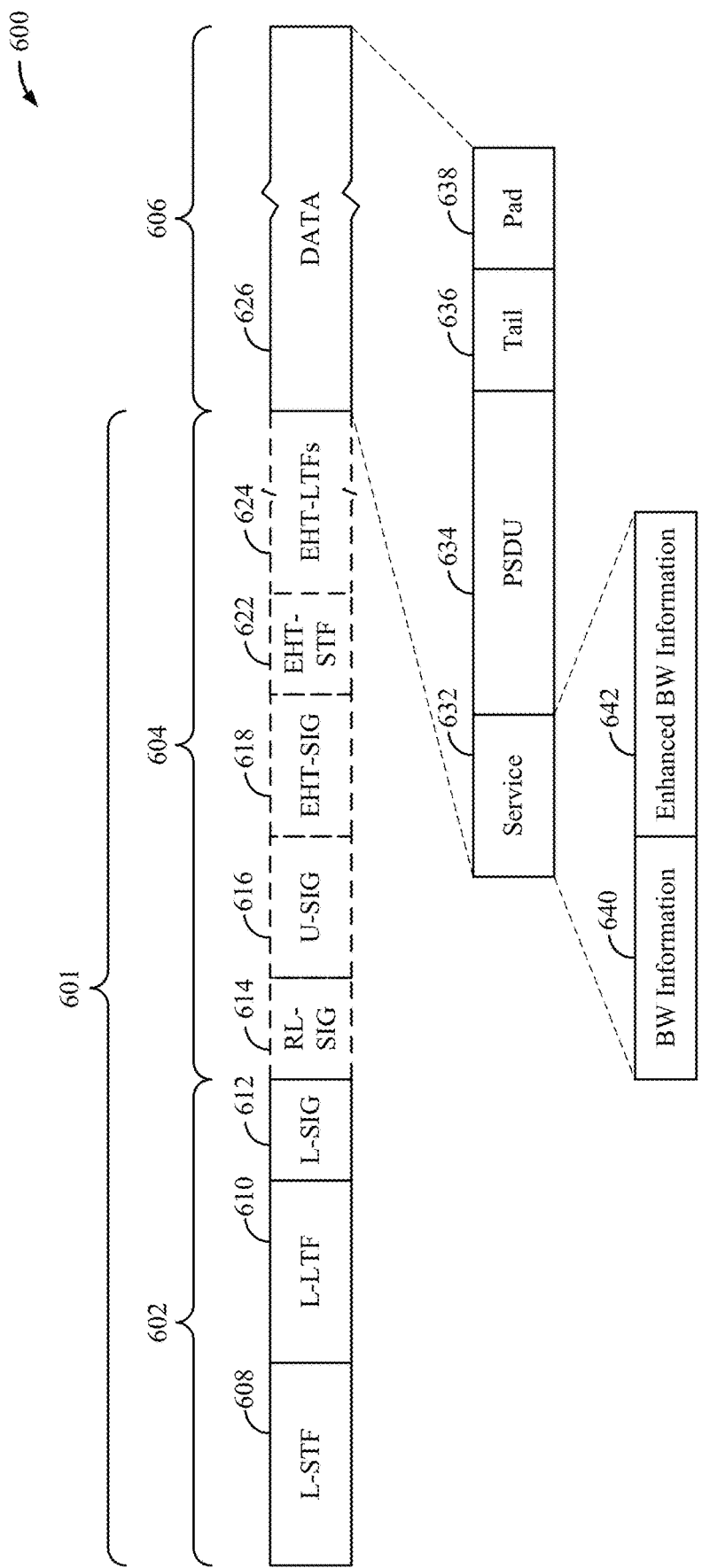
FIG. 6 shows an example PPDU format for a bandwidth negotiation frame usable for bandwidth negotiations between an AP and a STA according to some implementations.

FIG. 6 shows an example PPDU format for a bandwidth negotiation frame 600 usable for bandwidth negotiations between an AP and a STA according to some implementations. In some implementations, the bandwidth negotiation frame 600 may represent an RTS frame. In some other implementations, the bandwidth negotiation frame 600 may represent a CTS frame. The bandwidth negotiation frame 600 includes a PHY preamble 601 followed by a PHY payload 606, for example, in the form of a DATA field 626. The PHY preamble 601 includes L-STF 608, L-LTF 610, and L-SIG 612. In some implementations, L-STF 608, L-LTF 610, and L-SIG 612 may represent a legacy portion 602 of the PHY preamble 601. The legacy portion 602 of the preamble may be formatted as a non-High Throughput (non-HT) WLAN preamble as defined by the IEEE 802.11ax, and earlier generations, of the IEEE 802.11 standard.

In some implementations, the PHY preamble 601 may further include a non-legacy portion 604 which includes a repeated legacy signal field (RL-SIG) 614 and multiple wireless communication protocol version-dependent signal fields after RL-SIG 614. The non-legacy portion 604 of the preamble may be formatted as a non-legacy, or Extremely High Throughput (EHT), WLAN preamble in accordance with the IEEE 802.11be amendment to the IEEE 802.11 wireless communication protocol standard, or may be formatted as a preamble conforming to any later (post-HE) version of a new wireless communication protocol conforming to a future IEEE 802.11 wireless communication protocol amendment or other standard. For example, the non-legacy portion 604 may include a universal signal field (U-SIG) 616, a non-legacy signal field (EHT-SIG) 618, a non-legacy short training field (EHT-STF) 622, and a number of non-legacy long training fields (EHT-LTFs) 624.

The IEEE 802.11be amendment, and future generations, of the IEEE 802.11 standard define a non-legacy (or EHT) PPDU format including new fields which may be used to carry signaling information. For example, at least some of the new fields and signaling information may be included in U-SIG 616. Additionally, new fields and signaling information may be included in EHT-SIG 618 (or may overflow from U-SIG 616 into EHT-SIG 618). In some implementations, U-SIG 616 may include signaling regarding types or formats of additional signal fields (such as EHT-SIG 618) that follow U-SIG 616. EHT-SIG 618 may be used by an AP to identify and inform one or more STAs that the AP has scheduled UL or DL resources. EHT-SIG 618 may be decoded by each compatible STA served by the AP. EHT-SIG 618 may generally be used by a receiving device to interpret bits in the DATA field 626.

The DATA field 626 includes a service field 632, a PSDU 634, a tail 636, and zero or more pad bits 638. With reference for example to FIG. 3, the PSDU 634 may be one example of the PSDU 304 of the PPDU 300. Thus, the PSDU 634 carries the MAC layer information of the bandwidth negotiation frame 600. The tail 636 carries a known bit sequence that can be used to return a convolutional encoder, used to encode the DATA field 626, to a zero state. Pad bits 638 may be added to achieve a desired length for the DATA field 626 depending on the number of bits required per OFDM symbol. The information in the DATA field 626 may be scrambled by the transmitting device (such as the device which transmits the bandwidth negotiation frame 600). Accordingly, the service field 632 carries a scrambler initialization sequence that can be used to synchronize a descrambler of the receiving device (such as the device which receives the bandwidth negotiation frame 600), for example, to descramble the information in the DATA field 626.

The service field 632 also may carry bandwidth (BW) information 640 indicating a bandwidth associated with the bandwidth negotiation frame 600. For example, the IEEE 802.11ax amendment (and earlier generations) of the IEEE 802.11 standard defines a control frame format for RTS and CTS frames in which 2 bits of the scrambler initialization sequence (referred to herein as bandwidth bits BW1 and BW2) can be repurposed for bandwidth negotiation. The bandwidth bits BW1 and BW2 may have one of four possible values each representing a respective 20, 40, 80, or 160 (80+80) MHz bandwidth. In an RTS frame, the bandwidth information 640 may indicate a desired bandwidth over which the requesting device would like to transmit subsequent data frames. In a CTS frame, the bandwidth information 640 may indicate the bandwidth available to the requesting device for the transmission of the data frames.

Aspects of the present disclosure recognize that the existing bandwidth information 640 may not support the full range of bandwidths achievable under the IEEE 802.11be amendment of the IEEE 802.11 standard. More specifically, the bandwidth bits BW1 and BW2 may not be suitable for indicating bandwidths greater than 160 MHz. Thus, in some implementations, the service field 632 of the bandwidth negotiation frame 600 may be further configured to carry enhanced bandwidth information 642. In some aspects, the enhanced bandwidth information 642 may supplement the existing bandwidth information 640 to extend the possible bandwidth indications up to at least 320 MHz. For example, the enhanced bandwidth information 642 may be used to indicate whether the bandwidth negotiation frame 600 is transmitted on a 320 MHz channel whereas the existing bandwidth information 640 may be used to indicate bandwidths of up to 160 MHZ.

In some implementations, the bandwidth negotiation frame 600 may be formatted in accordance with a non-legacy or non-legacy PPDU format. For example, the PHY preamble 601 of the bandwidth negotiation frame 600 may include the non-legacy portion 604 shown in FIG. 6. In such implementations, a receiving device may determine that the service field 632 includes enhanced bandwidth information 642 based on detecting the non-legacy portion 604 of the PHY preamble 601. However, aspects of the present disclosure also recognize that legacy RTS and CTS frames are formatted in accordance with a non-HT PPDU format. In other words, legacy RTS and CTS frames do not include the non-legacy portion 604 of the PHY preamble. In some implementations, to maintain backwards compatibility with legacy RTS and CTS frames, the bandwidth negotiation frame 600 may be formatted in accordance with a non-HT PPDU format or a non-HT duplicate PPDU format. In such implementations, the PHY preamble 601 of the PPDU 600 may not include the non-legacy portion 604.

Figure 7A:
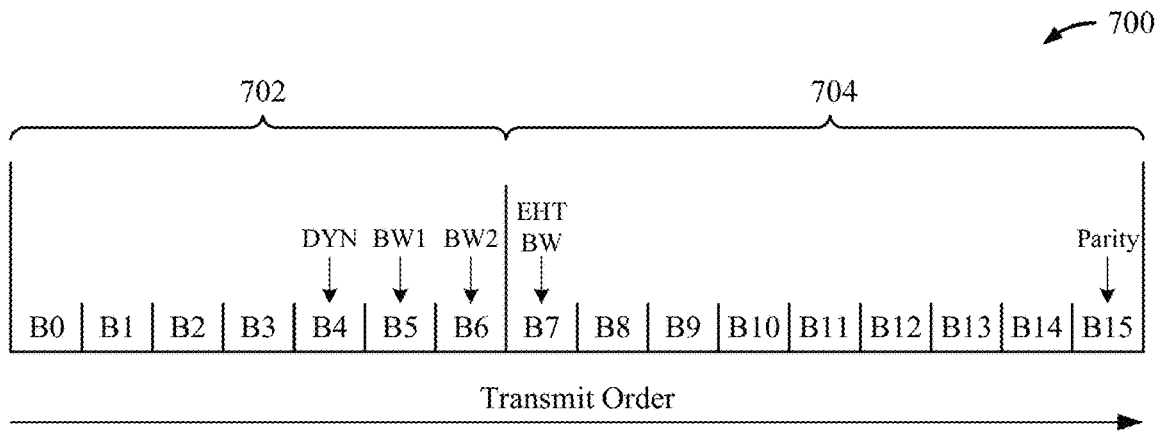
FIG. 7A shows an example configuration for a service field of a bandwidth negotiation frame according to some implementations.

FIG. 7A shows an example configuration for a service field 700 of a bandwidth negotiation frame according to some implementations. In some implementations, the service field 700 may be one example of the service field 632 of the bandwidth negotiation frame 600. More specifically, the service field 700 includes a sequence of scrambler initialization bits 702 and a number of remaining bits 704. As shown in FIG. 7A, the service field 700 is 2 octets (16 bits) in length, however, the scrambler initialization sequence 702 represents only the first 7 bits of the service field 700 (coinciding with bit positions B0-B6). As described above with reference to FIG. 6, the scrambler initialization sequence 702 may be used to synchronize a descrambler of a receiving device.

The last two bits of the scrambler initialization sequence 702 (coinciding with bit positions B5 and B6 of the service field 700) are repurposed as bandwidth bits BW1 and BW2. For example, the bandwidth bits BW1 and BW2 may carry bandwidth information in accordance with legacy RTS and CTS frame formats defined by the IEEE 802.11ax amendment of the IEEE 802.11 standard. As described above with reference to FIG. 6, the values of the bandwidth bits BW1 and BW2 can represent bandwidths up to 160 MHz. The fifth bit of the scrambler initialization sequence 702 (coinciding with bit position B4 of the service field 700) may be repurposed as a dynamic bandwidth (DYN) bit. The DYN bit indicates whether a receiving device is required to respond to the bandwidth negotiation frame (such as by transmitting a CTS frame) if one or more subchannels of the bandwidth indicated by the bandwidth bits BW1 and BW2 are occupied or otherwise unavailable.

Aspects of the present disclosure recognize that the remaining bits 704 of the service field 700 are reserved in the non-HT PPDU format. More specifically, each of the remaining bits 704 is set to a value of "0" in legacy RTS and CTS frames. In some implementations, at least one of the remaining bits 704 may be repurposed as an enhanced (EHT) bandwidth (BW) bit. In the example of FIG. 7A, the EHT BW bit immediately follows the scrambler initialization sequence 702 (coinciding with bit position B7 of the service field 700). However, in actual implementations, any of the remaining bits 704 may be repurposed as one or more EHT BW bits. In some aspects, a receiving device may determine that the service field 700 carries enhanced bandwidth information upon detecting one or more of the remaining bits 704 being set to a value of "1."

The EHT BW bit may carry enhanced bandwidth information that can be used to indicate bandwidths greater than 160 MHz. In some implementations, the value of the EHT BW bit may indicate whether the bandwidth is associated with a 320 MHz channel. With reference for example to Table 1, below, the EHT BW bit may be set to a value of "1" to indicate a 320 MHz bandwidth whereas the bandwidth bits BW1 and BW2 may be used to indicate bandwidths up to 160 MHz when the EHT BW bit is set to a value of "0." In some other implementations, combined values of the bandwidth bits BW1 and BW2 and the EHT BW bit may be used to indicate a 320 MHz bandwidth. With reference for example to Table 2, below, each of the bandwidth bits BW1 and BW2 and EHT BW bit may be set to a value of "1" to indicate a 320 MHz bandwidth whereas other bit combinations may be used to indicate various other bandwidths (to be determined).

TABLE 1

| Service Field | | | | Bandwidth | WLAN |
|---|---|---|---|---|---|
| EHT BW | BW1 | BW2 | DYN | (MHz) | Generation |
| 0 | 0 | 0 | Any | 20 | Legacy |
| 0 | 0 | 1 | Any | 40 | |
| 0 | 1 | 0 | Any | 80 | |
| 0 | 1 | 1 | Any | 160 (80 + 80) | |
| 1 | 0 | 0 | Any | 320 | Non-Legacy |
| 1 | 0 | 1 | Any | | |
| 1 | 1 | 0 | Any | | |
| 1 | 1 | 1 | Any | | |

TABLE 2

| Service Field | | | | Bandwidth | WLAN |
|---|---|---|---|---|---|
| EHT BW | BW1 | BW2 | DYN | (MHz) | Generation |
| 0 | 0 | 0 | Any | 20 | Legacy |
| 0 | 0 | 1 | Any | 40 | |
| 0 | 1 | 0 | Any | 80 | |
| 0 | 1 | 1 | Any | 160 (80 + 80) | |
| 1 | 0 | 0 | Any | TBD | Non-Legacy |
| 1 | 0 | 1 | Any | | |
| 1 | 1 | 0 | Any | | |
| 1 | 1 | 1 | Any | 320 | |

Aspects of the present disclosure recognize that because the remaining bits 704 are reserved in the non-HT PPDU format, existing versions of the IEEE 802.11 standard provide little (if any) protection for these remaining bits 704. In other words, a receiving device operating in accordance with the IEEE 802.11ax amendment of the IEEE 802.11 standard may be unable to detect errors in any of the remaining bits 704. Thus, in some implementations, at least one of the remaining bits 704 may be repurposed as a parity bit. In the example of FIG. 7A, the parity bit is the last bit of the service field 700 (coinciding with bit position B15). In some aspects, a receiving device may perform a parity check operation on the remaining bits 704 of the service field 700 based on the value of the parity bit.

Figure 7B:
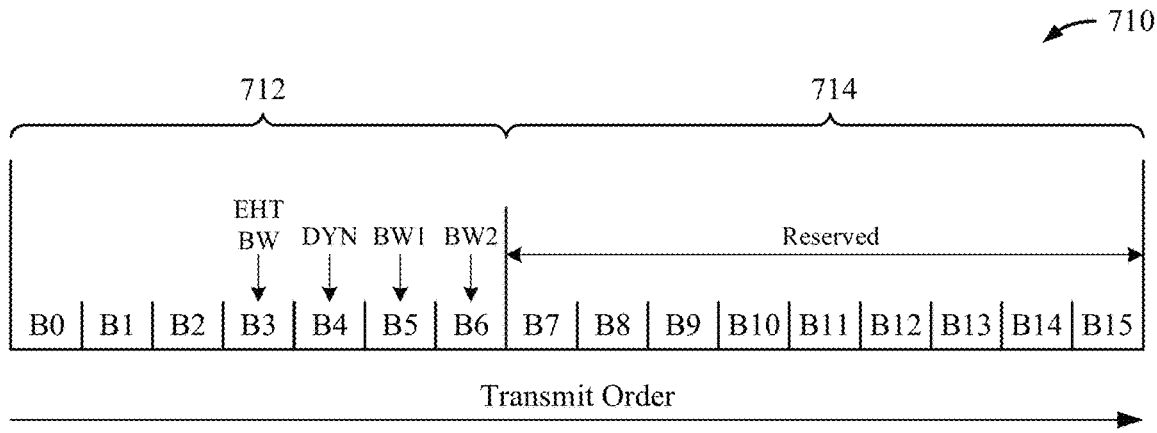
FIG. 7B shows another example configuration for a service field of a bandwidth negotiation frame according to some implementations.

FIG. 7B shows another example configuration for a service field 710 of a bandwidth negotiation frame according to some implementations. In some implementations, the service field 710 may be one example of the service field 632 of the bandwidth negotiation frame 600. More specifically, the service field 710 includes a sequence of scrambler initialization bits 712 and a number of remaining bits 714. As shown in FIG. 7B, the service field 710 is 2 octets (16 bits) in length, however, the scrambler initialization sequence 712 represents only the first 7 bits of the service field 710 (coinciding with bit positions B0-B6). As described above with reference to FIG. 6, the scrambler initialization sequence 712 may be used to synchronize a descrambler of a receiving device.

The last two bits of the scrambler initialization sequence 712 (coinciding with bit positions B5 and B6 of the service field 710) are repurposed as bandwidth bits BW1 and BW2. For example, the bandwidth bits BW1 and BW2 may carry bandwidth information in accordance with legacy RTS and CTS frame formats defined by the IEEE 802.11ax amendment of the IEEE 802.11 standard. As described above with reference to FIG. 6, the values of the bandwidth bits BW1 and BW2 can represent bandwidths up to 160 MHz. The fifth bit of the scrambler initialization sequence 712 (coinciding with bit position B4 of the service field 710) may be repurposed as a DYN bit. The DYN bit indicates whether a receiving device is required to respond to the bandwidth negotiation frame (such as by transmitting a CTS frame) if one or more subchannels of the bandwidth indicated by the bandwidth bits BW1 and BW2 are occupied or otherwise unavailable.

In some implementations, the fourth bit of the scrambler initialization sequence 712 (coinciding with bit position B3 of the service field 710) may be repurposed as an EHT BW bit. The EHT BW bit may carry enhanced bandwidth information that can be used to indicate bandwidths greater than 160 MHz. In some implementations, combined values of the bandwidth bits BW1 and BW2 and the EHT BW bit may be used to indicate a 320 MHZ bandwidth. With reference for example to Table 2, above, each of the bandwidth bits BW1 and BW2 and EHT BW bit may be set to a value of "1" to indicate a 320 MHz bandwidth whereas other bit combinations may be used to indicate various other bandwidths (to be determined). By repurposing a bit of the scrambler initialization sequence 712 as the EHT BW bit, the remaining bits 714 of the service field 700 can be used for other purposes (such as to carry additional signaling or information) or reserved for future generations of the IEEE 802.11 standard.

Aspects of the present disclosure recognize that repurposing a bit in the scrambler initialization sequence 712 as the EHT BW bit also reduces the effective number of scrambler initialization bits that can be used to synchronize the descrambler in the receiving device. For example, as shown in FIG. 7B, only the first three bits of the scrambler initialization sequence 712 can be used to synchronize the descrambler. On the other hand, aspects of the present disclosure also recognize that by expanding the range of supported bandwidths to 320 MHz, non-legacy wireless communication devices may be more likely to request a CTS frame from a responding device even if one or more subchannels of the desired bandwidth are occupied or unavailable. Thus, in some implementations, a receiving device may be required to respond to a bandwidth negotiation frame carrying enhanced bandwidth information if at least a portion of the desired bandwidth is available for use by the transmitting device. As a result, the DYN bit may be omitted from the service field of a bandwidth negotiation frame that carries enhanced bandwidth information.

Figure 7C:
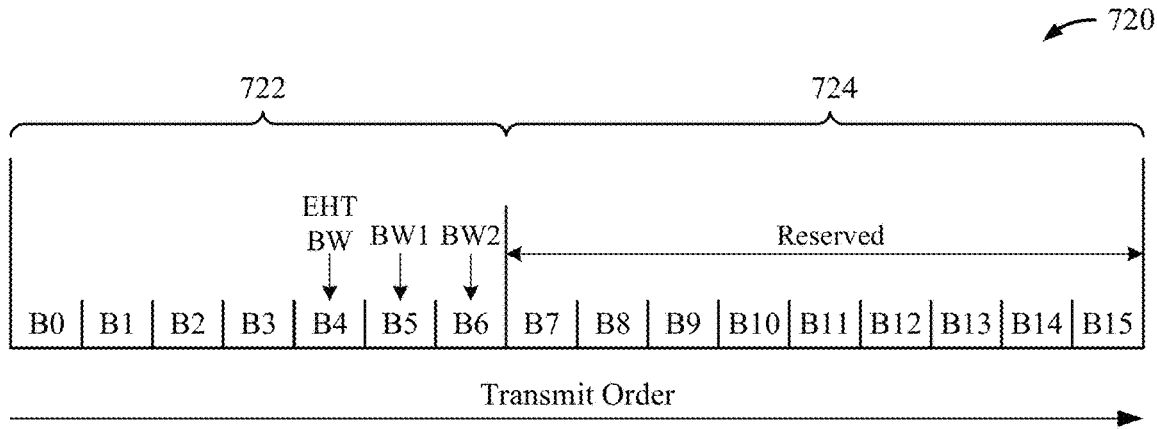
FIG. 7C shows another example configuration for a service field of a bandwidth negotiation frame according to some implementations.

FIG. 7C shows another example configuration for a service field 720 of a bandwidth negotiation frame according to some implementations. In some implementations, the service field 720 may be one example of the service field 632 of the bandwidth negotiation frame 600. More specifically, the service field 720 includes a sequence of scrambler initialization bits 722 and a number of remaining bits 724. As shown in FIG. 7C, the service field 720 is 2 octets (16 bits) in length, however, the scrambler initialization sequence 722 represents only the first 7 bits of the service field 720 (coinciding with bit positions B0-B6). As described above with reference to FIG. 6, the scrambler initialization sequence 722 may be used to synchronize a descrambler of a receiving device.

The last two bits of the scrambler initialization sequence 722 (coinciding with bit positions B5 and B6 of the service field 720) are repurposed as bandwidth bits BW1 and BW2. For example, the bandwidth bits BW1 and BW2 may carry bandwidth information in accordance with legacy RTS and CTS frame formats defined by the IEEE 802.11ax amendment of the IEEE 802.11 standard. As described above with reference to FIG. 6, the values of the bandwidth bits BW1 and BW2 can represent bandwidths up to 160 MHz. In contrast to the service field 710 illustrated in FIG. 7B, the service field 720 does not include a DYN bit. In some implementations, a receiving device may be required to respond to the bandwidth negotiation frame (such as by transmitting a CTS frame) if at least one subchannel (such as the primary channel) within the bandwidth indicated by the service field 720 is unoccupied or otherwise available for use by the transmitting device.

In some implementations, the fifth bit of the scrambler initialization sequence 722 (coinciding with bit position B4 of the service field 720) may be repurposed as an EHT BW bit. The EHT BW bit may carry enhanced bandwidth information that can be used to indicate bandwidths greater than 160 MHz. In some implementations, combined values of the bandwidth bits BW1 and BW2 and the EHT BW bit may be used to indicate a 320 MHz bandwidth. With reference for example to Table 3, below, each of the bandwidth bits BW1 and BW2 and EHT BW bit may be set to a value of "1" to indicate a 320 MHz bandwidth whereas other bit combinations may be used to indicate various other bandwidths (to be determined). By repurposing a bit of the scrambler initialization sequence 722 as the EHT BW bit, the remaining bits 724 of the service field 700 can be used for other purposes (such as to carry additional signaling or information) or reserved for future generations of the IEEE 802.11 standard.

TABLE 3

| Service Field | | | Bandwidth | WLAN |
| --- | --- | --- | --- | --- |
| EHT BW | BW1 | BW2 | (MHz) | Generation |
| 0 | 0 | 0 | 20 | Legacy |
| 0 | 0 | 1 | 40 | |
| 0 | 1 | 0 | 80 | |
| 0 | 1 | 1 | 160 (80 + 80) | |
| 1 | 0 | 0 | TBD | Non-Legacy |
| 1 | 0 | 1 | | |
| 1 | 1 | 0 | | |
| 1 | 1 | 1 | 320 | |

Although, the IEEE 802.11ax amendment of the IEEE 802.11 standard provides a mechanism for signaling the presence of bandwidth information in the scrambler initialization sequence (such as by setting an individual/group bit in a transmitter address (TA) field to a value of "1"), aspects of the present disclosure recognize that the value of the individual/group bit in the TA field cannot indicate whether the scrambler initialization sequence also includes enhanced bandwidth information. With reference for example to FIG. 7B, a non-legacy receiving device may be unable to determine, based on the value of the individual/group bit in the TA field of an RTS frame, whether to interpret the fourth bit of the scrambler initialization sequence as an EHT BW bit or a scrambler initialization bit. With reference for example to FIG. 7C, a non-legacy receiving device may be unable to determine, based on the value of the individual/group bit in the TA field of an RTS frame, whether to interpret the fifth bit of the scrambler initialization sequence as an EHT BW bit or a DYN bit.

In some implementations, an RTS frame may implicitly signal the availability of enhanced bandwidth information. For example, a receiving device may determine, based on the MAC address indicated in the TA field of a received RTS frame, whether the RTS frame is transmitted by a non-legacy transmitting device. If the receiving device determines that the MAC address is associated with a known non-legacy transmitting device, the receiving device may then interpret the scrambler initialization sequence to include enhanced bandwidth information. A receiving device can determine that a transmitting device is a non-legacy device based on information carried in management frames (such as beacon frames, association request frames, or association response frames, among other examples) or the A-Control field of other frames received from the transmitting device. In some other implementations, an RTS frame may explicitly signal the availability of enhanced bandwidth information. For example, a transmitting device may set the values of the individual/group bits in each of the TA and receiver address (RA) fields of the RTS frame to indicate that the scrambler initialization sequence of the RTS frame carries enhanced bandwidth information.

Figure 8A:
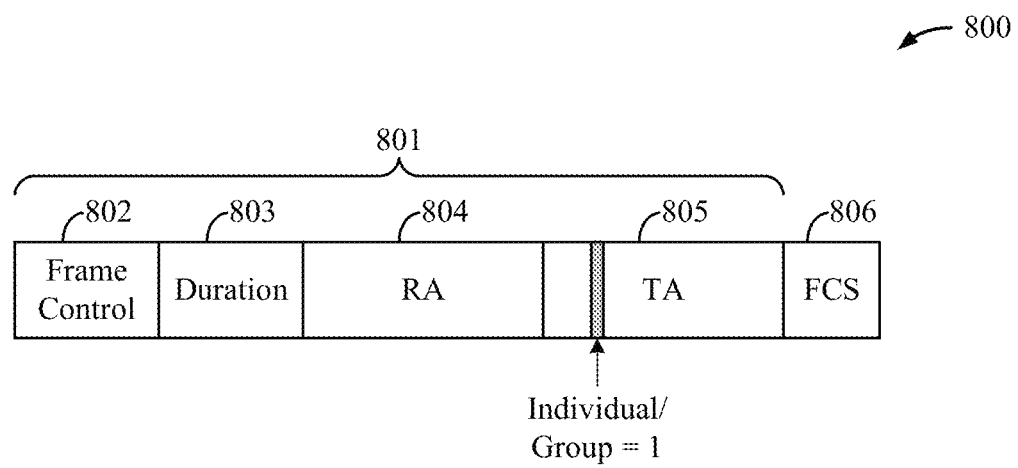
FIG. 8A shows an example configuration for a request-to-send (RTS) frame according to some implementations.

FIG. 8A shows an example configuration for an RTS frame 800 according to some implementations. In some implementations, the RTS frame 800 may be one example of the bandwidth negotiation frame 600 of FIG. 6. More specifically, the RTS frame 800 may represent a MAC layer of the bandwidth negotiation frame 600. The RTS frame 800 includes a MAC header 801 followed by a frame check sequence (FCS) 806. The MAC header 801 further includes a frame control field 802, a duration field 803, an RA field 804, and a TA field 805. The frame control field 802 carries information indicating a frame type (such as a control frame) associated with the RTS frame 800. The duration field 803 carries information indicating a duration for which the wireless medium is to be reserved for the reception of the RTS frame 800. The RA field 804 carries a MAC address of the receiving device (such as the intended recipient of the RTS frame 800) and the TA field 806 carries a MAC address of the transmitting device (such as the transmitter of the RTS frame 800).

An individual/group bit in the TA field 805 may be set to a value of "1" to signal the presence of bandwidth information in a scrambler initialization sequence of a service field of the RTS frame 800. However, as described above, the value of the individual/group bit in the TA field 805 may not indicate whether the service field carries enhanced bandwidth information. In some implementations, after detecting that the individual/group bit in the TA field 805 is set to a value of "1," a receiving device may determine whether the MAC address indicated in the RA field 804 belongs to a non-legacy transmitting device. For example, the receiving device may store the MAC addresses of known non-legacy transmitting devices during respective association procedures between the receiving device and the non-legacy transmitting devices. As such, the receiving device may compare the MAC address indicated in the TA field 804 of the RTS frame 800 with a list of known MAC addresses belonging to non-legacy transmitting devices. Upon determining that the MAC address indicated in the TA field 804 belongs to a non-legacy transmitting device, the receiving device may interpret one or more bits of the scrambler initialization sequence to carry enhanced bandwidth information (such as described with reference to FIGS. 7B and 7C).

Figure 8B:
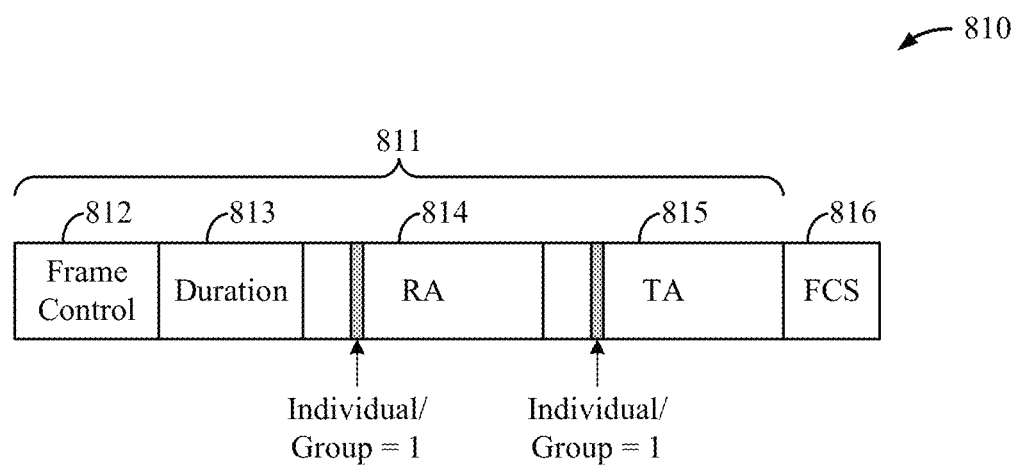
FIG. 8B shows another example configuration for an RTS frame according to some implementations.

FIG. 8B shows another example configuration for an RTS frame 810 according to some implementations. In some implementations, the RTS frame 810 may be one example of the bandwidth negotiation frame 600 of FIG. 6. More specifically, the RTS frame 810 may represent a MAC layer of the bandwidth negotiation frame 600. The RTS frame 810 includes a MAC header 811 followed by a frame check sequence (FCS) 816. The MAC header 811 further includes a frame control field 812, a duration field 813, an RA field 814, and a TA field 815. The frame control field 812 carries information indicating a frame type (such as a control frame) associated with the RTS frame 810. The duration field 813 carries information indicating a duration for which the wireless medium is to be reserved for the reception of the RTS frame 810. The RA field 814 carries a MAC address of the receiving device (such as the intended recipient of the RTS frame 810) and the TA field 816 carries a MAC address of the transmitting device (such as the transmitter of the RTS frame 810).

An individual/group bit in the TA field 815 may be set to a value of "1" to signal the presence of bandwidth information in a scrambler initialization sequence of a service field of the RTS frame 810. However, as described above, the value of the individual/group bit in the TA field 805 may not indicate whether the service field carries enhanced bandwidth information. In some implementations, an individual/group bit in the RA field 814 also may be set to a value of "1" to indicate that the scrambler initialization sequence carries enhanced bandwidth information. For example, a receiving device may determine that the RTS frame 810 is transmitted by a non-legacy transmitting device based on detecting that the values of the individual/group bits in each of the RA field 814 and the TA field 815 are set to "1." Upon determining that the values of the individual/group bits in the RA field 814 and the TA field 815 are set to "1," the receiving device may interpret one or more bits of the scrambler initialization sequence to carry enhanced bandwidth information (such as described with reference to FIGS. 7B and 7C).

Figure 9:
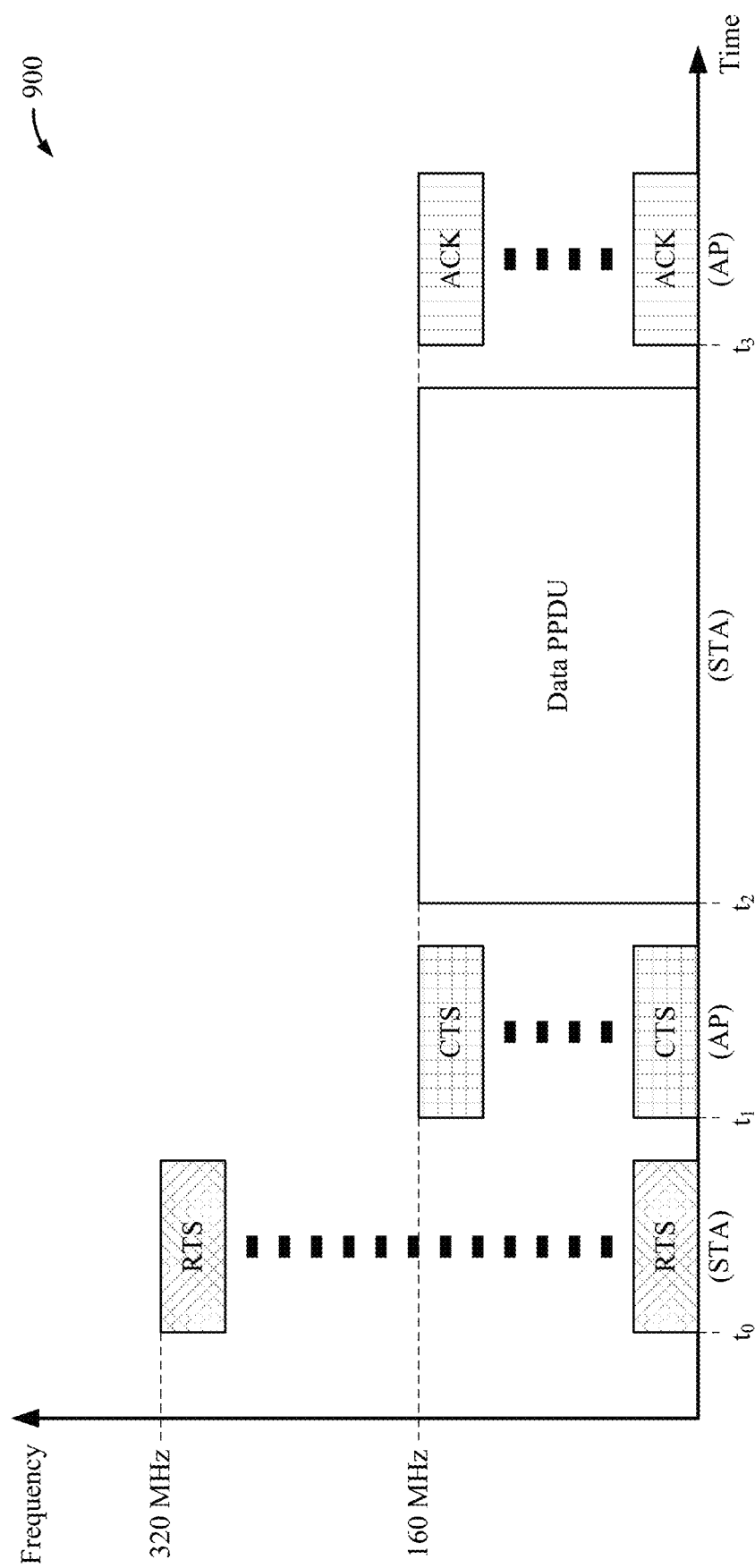
FIG. 9 shows a timing diagram illustrating an example bandwidth negotiation operation between an AP and a STA according to some implementations.

FIG. 9 shows a timing diagram 900 illustrating an example bandwidth negotiation operation between an AP and a STA according to some implementations. The AP may be one example of the APs 102 or 502 of FIGS. 1 and 5A, respectively. The STA may be one example of the STAs 104 or 504 of FIGS. 1 and 5B, respectively. In the example of FIG. 9, the STA is described as the requesting device and the AP is described as the responding device. However, in other implementations, the AP may be the requesting device and the STA may be the responding device.

At time t0, the STA transmits an RTS frame to the AP that is duplicated over a 320 MHz channel. In some implementations, the RTS frame may carry enhanced bandwidth information indicating the 320 MHz channel. In some aspects, the enhanced bandwidth information may be carried by one or more remaining bits following a scrambler initialization sequence in the service field of the RTS frame (such as described with reference to FIG. 7A). In some other aspects, the enhanced bandwidth information may be carried by the fourth bit of the scrambler initialization sequence in the service field of the RTS frame (such as described with reference to FIG. 7B). Still further, in some aspects, the enhanced bandwidth information may be carried by the fifth bit of the scrambler initialization sequence in the service field of the RTS frame (such as described with reference to FIG. 7C).

The AP receives the RTS frame and determines that the transmitting STA is a non-legacy STA. In some implementations, the AP may determine that the transmitting STA is a non-legacy STA based on determining that the RTS frame is formatted in accordance with a non-legacy PPDU format (such as described with reference to FIG. 6). In some other implementations, the AP may determine that the transmitting STA is a non-legacy STA based on determining that one or more of the remaining bits of the service field are set to a value of "1" (such as described with reference to FIG. 7A). Still further, in some implementations, the AP may determine that the transmitting STA is a non-legacy STA based on explicit or implicit signaling in the RTS frame (such as described with reference to FIGS. 8A and 8B).

After determining that the RTS frame is transmitted by a non-legacy STA, the AP may interpret one or more bits of the service field to carry enhanced bandwidth information. The AP may determine, based on the enhanced bandwidth information, that the non-legacy STA is requesting to transmit a data PPDU over a 320 MHz channel. In the example of FIG. 9, the AP may determine that only 160 MHz of spectrum is available (or supported by the AP) for transmissions by the requesting STA. The AP may further determine that it is required to respond to the RTS frame even though a number of subchannels of the requested 320 MHz channel are occupied or unavailable. In some implementations, the AP may determine that the response is required based on a value of a DYN bit (such as described with reference to FIGS. 7A and 7B). In some other implementations, the AP may determine that the response is required based on determining that the RTS frame is transmitted by a non-legacy STA (such as described with reference to FIG. 7C).

Thus, at time $t_1$, the AP transmits a CTS frame to the STA that is duplicated over a 160 MHz subchannel of the requested 320 MHz channel. Unlike the RTS frame transmitted by the STA, there is no need for the CTS frame to indicate that it carries enhanced bandwidth information. This is because the STA (the transmitter of the RTS frame) is already aware that the AP is a non-legacy device. In other words, the EHT BW bit in the CTS frame from the AP is always set to indicate enhanced bandwidth information (such as described with reference to FIGS. 7A-7C) when responding to an RTS frame that contains enhanced bandwidth information. In some implementations, the enhanced bandwidth information may be carried by the same bit(s) in the CTS frame as in the RTS frame. In some other implementations, the enhanced bandwidth information may be carried by different bit(s) in the CTS frame than in the RTS frame.

In the example of FIG. 9, the enhanced bandwidth information in the CTS frame may indicate that the AP does not support the 320 MHz bandwidth requested by the STA. For example, the bit carrying the enhanced bandwidth information in the CTS frame may be set to a value of "0." The supported 160 MHz bandwidth may be indicated by the values of the bandwidth bits BW1 and BW2 in the service field of the CTS frame. The STA receives the CTS frame and, at time $t_2$, proceeds to transmit a data PPDU to the AP over the 160 MHZ subchannel. At time $t_3$, the AP confirms receipt of the data PPDU by transmitting an acknowledgement (ACK) frame back to the STA. As shown in FIG. 9, the ACK frame also may be duplicated over the 160 MHz subchannel.

Figure 10:
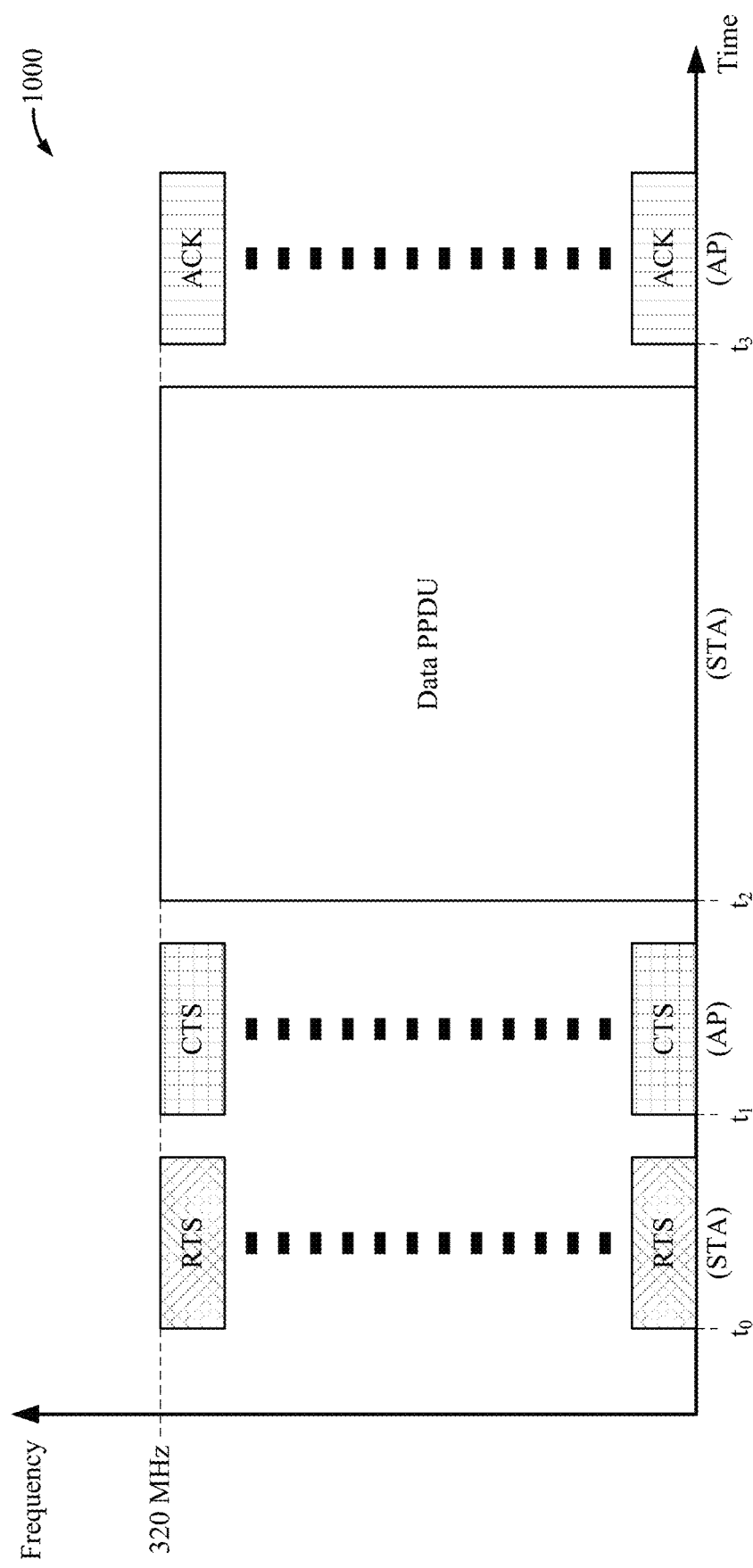
FIG. 10 shows a timing diagram illustrating another example bandwidth negotiation operation between an AP and a STA according to some implementations.

FIG. 10 shows a timing diagram 1000 illustrating another example bandwidth negotiation operation between an AP and a STA according to some implementations. The AP may be one example of the APs 102 or 502 of FIGS. 1 and 5A, respectively. The STA may be one example of the STAs 104 or 504 of FIGS. 1 and 5B, respectively. In the example of FIG. 10, the STA is described as the requesting device and the AP is described as the responding device. However, in other implementations, the AP may be the requesting device and the STA may be the responding device.

At time to, the STA transmits an RTS frame to the AP that is duplicated over a 320 MHz channel. In some implementations, the RTS frame may carry enhanced bandwidth information indicating the 320 MHz channel. For example, the enhanced bandwidth information may be carried by one or more remaining bits following a scrambler initialization sequence in the service field of the RTS frame (such as described with reference to FIG. 7A). The AP receives the RTS frame and determines that the transmitting STA is a non-legacy STA. In some implementations, the AP may determine that the transmitting STA is a non-legacy STA based on determining that one or more of the remaining bits of the service field are set to a value of "1" (such as described with reference to FIG. 7A).

After determining that the RTS frame is transmitted by a non-legacy STA, the AP may interpret one or more bits of the service field to carry enhanced bandwidth information. The AP may determine, based on the enhanced bandwidth information, that the non-legacy STA is requesting to transmit a data PPDU over a 320 MHz channel. In the example of FIG. 10, the AP may determine that the requested 320 MHz channel is available for transmissions by the requesting STA. Thus, at time $t_1$, the AP transmits a CTS frame to the STA that is duplicated over the 320 MHz channel. In some implementations, the CTS frame may carry enhanced bandwidth information indicating that the AP can support the requested the 320 MHz bandwidth. For example, the enhanced bandwidth information may be carried by the fourth bit of the scrambler initialization sequence in the service field of the RTS frame (such as described with reference to FIG. 7B).

The STA receives the CTS frame and, at time $t_2$, proceeds to transmit a data PPDU to the AP over the 320 MHz channel. At time $t_3$, the AP confirms receipt of the data PPDU by transmitting an ACK frame back to the STA. As shown in FIG. 10, the ACK frame also may be duplicated over the 320 MHz channel.

Figure 11:
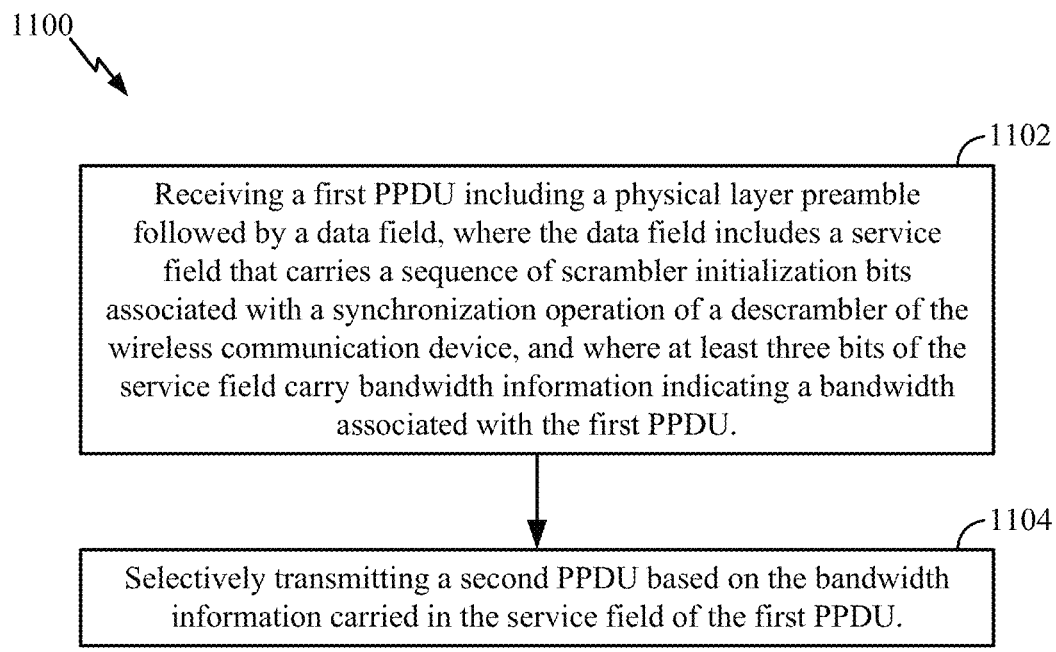
FIG. 11 shows a flowchart illustrating an example process for wireless communication that supports enhanced bandwidth negotiation according to some implementations.

FIG. 11 shows a flowchart illustrating an example process 1100 for wireless communication that supports enhanced bandwidth negotiation according to some implementations. In some implementations, the process 1100 may be performed by a wireless communication device operating as or within an AP such as one of the APs 102 or 502 of FIGS. 1 and 5A, respectively. In some other implementations, the process 1100 may be performed by a wireless communication device operating as or within a STA such as one of the STAs 104 or 504 of FIGS. 1 and 5B, respectively.

In some implementations, the process 1100 begins in block 1102 by receiving a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU. In block 1104, the process 1100 proceeds with selectively transmitting a second PPDU based on the bandwidth information carried in the service field of the first PPDU.

In some aspects, the at least three bits carrying the bandwidth information may include two of the scrambler initialization bits and a first bit of the service field following the sequence of scrambler initialization bits. In some implementations, the two scrambler initialization bits may be located in the sixth and seventh bit positions of the service field and the first bit following the sequence of scrambler initialization bits may be located in the eighth bit position of the service field. In some implementations, the first bit following the sequence of scrambler initialization bits may be set to a value equal to 1. In some implementations, each of the two scrambler initialization bits may be set to a value equal to 0.

In some implementations, the bandwidth information may indicate that the bandwidth associated with the first PPDU is equal to 320 MHz. In some implementations, the service field may further include a second bit, following the sequence of scrambler initialization bits, that carries parity check information associated with the service field.

In some implementations, the second PPDU may be transmitted responsive to receiving the first PPDU, where the second PPDU has a bandwidth that is less than or equal to the bandwidth associated with the first PPDU. In some implementations, the first PPDU may be an RTS frame and the second PPDU may be a CTS frame. In some other implementations, the first PPDU may be a CTS frame and the second PPDU may be a data frame.

In some aspects, the at least three bits carrying the bandwidth information may include three of the scrambler initialization bits. In some implementations, a TA field of the first PPDU may include a respective individual/group bit set to a value equal to 1 and an RA field of the first PPDU may include a respective individual/group bit set to a value equal to 1.

Figure 12:
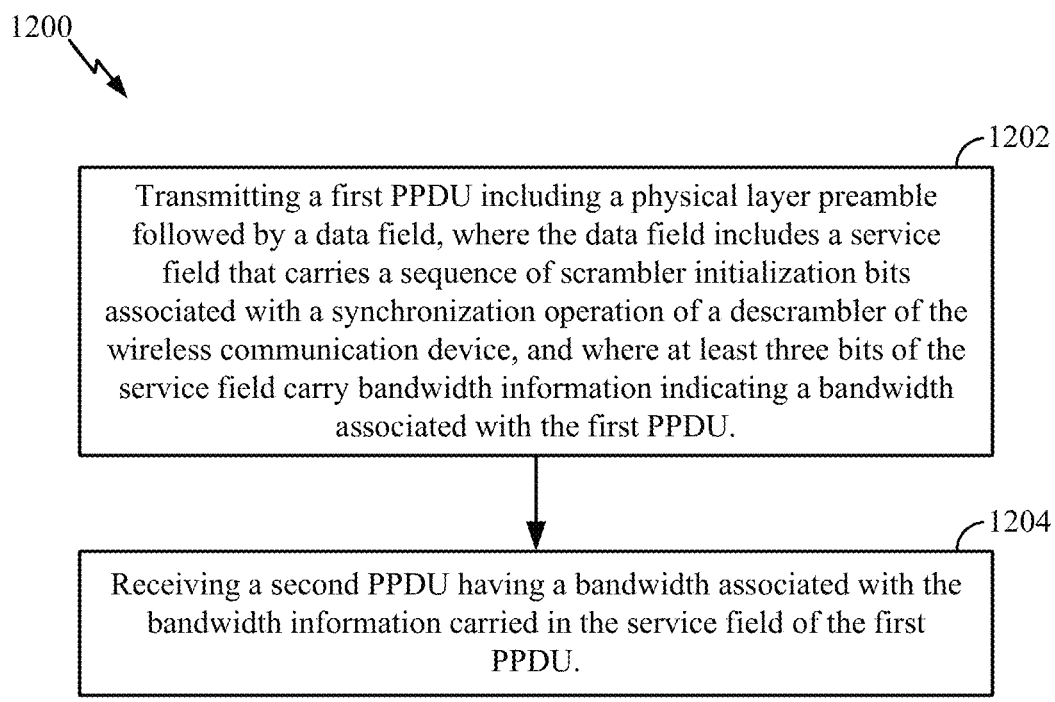
FIG. 12 shows a flowchart illustrating an example process for wireless communication that supports enhanced bandwidth negotiation according to some implementations.

FIG. 12 shows a flowchart illustrating an example process 1200 for wireless communication that supports enhanced bandwidth negotiation according to some implementations. In some implementations, the process 1200 may be performed by a wireless communication device operating as or within an AP such as one of the APs 102 or 502 of FIGS. 1 and 5A, respectively. In some other implementations, the process 1200 may be performed by a wireless communication device operating as or within a STA such as one of the STAs 104 or 504 of FIGS. 1 and 5B, respectively.

In some implementations, the process 1200 begins in block 1202 by transmitting a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU. In block 1204, the process 1200 proceeds with receiving a second PPDU having a bandwidth associated with the bandwidth information carried in the service field of the first PPDU.

In some aspects, the at least three bits carrying the bandwidth information may include two of the scrambler initialization bits and a first bit of the service field following the sequence of scrambler initialization bits. In some implementations, the two scrambler initialization bits may be located in the sixth and seventh bit positions of the service field and the first bit following the sequence of scrambler initialization bits may be located in the eighth bit position of the service field. In some implementations, the first bit following the sequence of scrambler initialization bits may be set to a value equal to 1. In some implementations, each of the two scrambler initialization bits may be set to a value equal to 0.

In some implementations, the bandwidth information may indicate that the bandwidth associated with the first PPDU is equal to 320 MHz. In some implementations, the service field may further include a second bit, following the sequence of scrambler initialization bits, that carries parity check information associated with the service field.

In some implementations, the bandwidth of the second PPDU may be less than or equal to the bandwidth associated with the first PPDU. In some implementations, the first PPDU may be an RTS frame and the second PPDU may be a CTS frame. In some other implementations, the first PPDU may be a CTS frame and the second PPDU is a data frame.

In some aspects, the at least three bits carrying the bandwidth information may include three of the scrambler initialization bits. In some implementations, a TA field of the first PPDU may include a respective individual/group bit set to a value equal to 1 and an RA field of the first PPDU may include a respective individual/group bit set to a value equal to 1.

Figure 13:
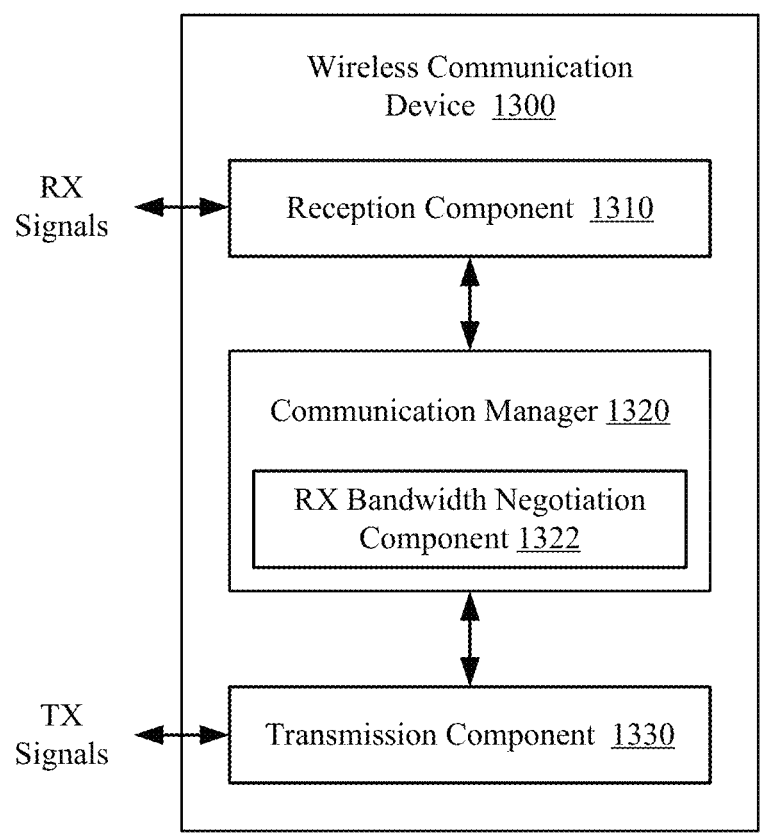
FIG. 13 shows a block diagram of an example wireless communication device according to some implementations.

FIG. 13 shows a block diagram of an example wireless communication device according to some implementations. In some implementations, the wireless communication device 1300 is configured to perform the process 1100 described above with reference to FIG. 11. In some implementations, the wireless communication device 1300 can be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 may further include a receive (RX) bandwidth negotiation component 1322. Portions of the RX bandwidth negotiation component 1322 may be implemented at least in part in hardware or firmware. In some implementations, the RX bandwidth negotiation component 1322 is implemented at least in part as software stored in a memory (such as the memory 408). For example, portions of the RX bandwidth negotiation component 1322 can be implemented as non-transitory instructions or code executable by a processor (such as the processor 406) to perform the functions or operations of the respective component.

The reception component 1310 is configured to receive RX signals from one or more other wireless communication devices and the transmission component 1330 is configured to transmit TX signals to one or more other wireless communication devices. In some implementations, the reception component 1310 may receive a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU. The communication manager 1320 is configured to manage communications with one or more other wireless communication devices. In some implementations, RX bandwidth negotiation component 1322 may selectively transmit a second PPDU based on the bandwidth information carried in the service field of the first PPDU.

Figure 14:
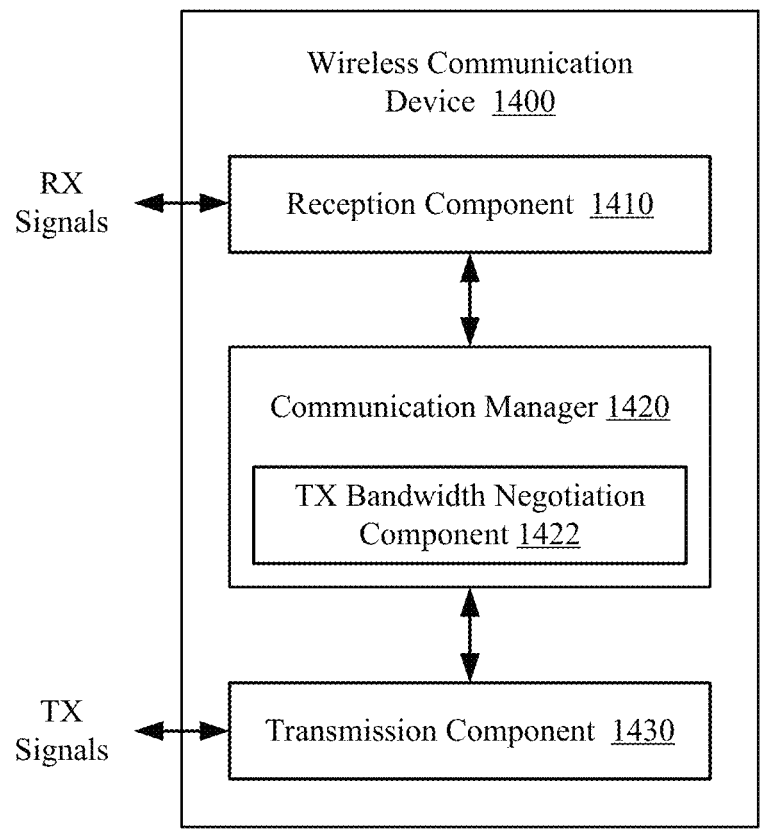
FIG. 14 shows a block diagram of an example wireless communication device according to some implementations.

FIG. 14 shows a block diagram of an example wireless communication device according to some implementations. In some implementations, the wireless communication device 1400 is configured to perform the process 1200 described above with reference to FIG. 12. In some implementations, the wireless communication device 1400 can be an example implementation of the wireless communication device 400 described above with reference to FIG. 4. For example, the wireless communication device 1400 can be a chip, SoC, chipset, package or device that includes at least one processor and at least one modem (for example, a Wi-Fi (IEEE 802.11) modem or a cellular modem).

The wireless communication device 1400 includes a reception component 1410, a communication manager 1420, and a transmission component 1430. The communication manager 1420 may further include a transmit (TX) bandwidth negotiation component 1422. Portions of the TX bandwidth negotiation component 1422 may be implemented at least in part in hardware or firmware. In some implementations, the TX bandwidth negotiation component 1422 is implemented at least in part as software stored in a memory (such as the memory 408). For example, portions of the TX bandwidth negotiation component 1422 can be implemented as non-transitory instructions or code executable by a processor (such as the processor 406) to perform the functions or operations of the respective component.

The reception component 1410 is configured to receive RX signals from one or more other wireless communication devices and the transmission component 1430 is configured to transmit TX signals to one or more other wireless communication devices. The communication manager 1420 is configured to manage communications with one or more other wireless communication devices. In some implementations, TX bandwidth negotiation component 1422 may transmit a first PPDU including a physical layer preamble followed by a data field, where the data field includes a service field that carries a sequence of scrambler initialization bits associated with a synchronization operation of a descrambler of the wireless communication device, and where at least three bits of the service field carry bandwidth information indicating a bandwidth associated with the first PPDU. In some implementations, the reception component 1410 may receive a second PPDU having a bandwidth associated with the bandwidth information carried in the service field of the first PPDU.

Implementation examples are described in the following numbered clauses:

1. A method for wireless communication by a wireless communication device, including:
   receiving a first physical layer convergence protocol (PLCP) protocol data unit (PPDU) including a physical layer preamble followed by a data field, the data field including a service field that carries a sequence of scrambler initialization bits associated with a synchronization operation of a descrambler of the wireless communication device, at least three bits of the service field carrying bandwidth information indicating a bandwidth associated with the first PPDU; and
   selectively transmitting a second PPDU based on the bandwidth information carried in the service field of the first PPDU.
2. The method of clause 1, where the at least three bits carrying the bandwidth information include two of the scrambler initialization bits and a first bit of the service field following the sequence of scrambler initialization bits.
3. The method of any of clauses 1 or 2, where the two scrambler initialization bits are located in the sixth and seventh bit positions of the service field and the first bit following the sequence of scrambler initialization bits is located in the eighth bit position of the service field.
4. The method of any of clauses 1-3, where the first bit following the sequence of scrambler initialization bits is set to a value equal to 1.
5. The method of any of clauses 1-4, where each of the two scrambler initialization bits is set to a value equal to 0.
6. The method of any of clauses 1-5, where the service field further includes a second bit, following the sequence of scrambler initialization bits, that carries parity check information associated with the service field.
7. The method of any of clauses 1-6, where the bandwidth information indicates that the bandwidth associated with the first PPDU is equal to 320 MHz.
8. The method of any of clauses 1-7, where the selective transmitting of the second PPDU includes:
   transmitting the second PPDU responsive to receiving the first PPDU, the second PPDU having a bandwidth that is less than or equal to the bandwidth associated with the first PPDU.
9. The method of any of clauses 1-8, where the first PPDU is a request-to-send (RTS) frame and the second PPDU is a clear-to-send (CTS) frame.
10. The method of any of clauses 1-8, where the first PPDU is a CTS frame and the second PPDU is a data frame.
11. The method of any of clauses 1 or 7-10, where the at least three bits carrying the bandwidth information include three of the scrambler initialization bits.
12. The method of any of clauses 1 or 7-11, where a transmitter address (TA) field of the first PPDU includes a respective individual/group bit set to a value equal to 1 and a receiver address (RA) field of the first PPDU includes a respective individual/group bit set to a value equal to 1.
13. A wireless communication device comprising:
   at least one processor; and
   at least one memory communicatively coupled with the at least one processor and storing processor-readable code that, when executed by the at least one processor, is configured to perform the method of any of clauses 1-12.
14. A method for wireless communication by a wireless communication device, including:
   transmitting a first physical layer convergence protocol (PLCP) protocol data unit (PPDU) including a physical layer preamble followed by a data field, the data field including a service field that carries a sequence of scrambler initialization bits associated with a synchronization operation of a descrambler of the wireless communication device, at least three bits of the service field carrying bandwidth information indicating a bandwidth associated with the first PPDU; and receiving a second PPDU having a bandwidth associated with the bandwidth information carried in the service field of the first PPDU.
15. The method of clause 14, where the at least three bits carrying the bandwidth information include two of the scrambler initialization bits and a first bit of the service field following the sequence of scrambler initialization bits.
16. The method of any of clauses 14 or 15, where the two scrambler initialization bits are located in the sixth and seventh bit positions of the service field and the first bit following the sequence of scrambler initialization bits is located in the eighth bit position of the service field.
17. The method of any of clauses 14-16, where the first bit following the sequence of scrambler initialization bits is set to a value equal to 1.
18. The method of any of clauses 14-17, where each of the two scrambler initialization bits is set to a value equal to 0.
19. The method of any of clauses 14-18, where the service field further includes a second bit, following the sequence of scrambler initialization bits, that carries parity check information associated with the service field.
20. The method of any of clauses 14-19, where the bandwidth information indicates that the bandwidth associated with the first PPDU is equal to 320 MHz.
21. The method of any of clauses 14-20, where the bandwidth of the second PPDU is less than or equal to the bandwidth associated with the first PPDU.
22. The method of any of clauses 14-21, where the first PPDU is a request-to-send (RTS) frame and the second PPDU is a clear-to-send (CTS) frame.
23. The method of any of clauses 14-21, where the first PPDU is a CTS frame and the second PPDU is a data frame.

24. The method of any of clauses 14 or 20-23, where the at least three bits carrying the bandwidth information include three of the scrambler initialization bits.

25. The method of any of clauses 14 or 20-24, where a transmitter address (TA) field of the first PPDU includes a respective individual/group bit set to a value equal to 1 and a receiver address (RA) field of the first PPDU includes a respective individual/group bit set to a value equal to 1.

26. A wireless communication device comprising:
at least one processor; and
at least one memory communicatively coupled with the at least one processor and storing processor-readable code that, when executed by the at least one processor, is configured to perform the method of any of clauses 14-25.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A wireless communication device comprising:
one or more processors;
one or more memories coupled with the one or more processors; and
one or more processor-readable instructions stored in the one or more memories and executable by the one or more processors to cause the wireless communication device to:
receive a first physical layer convergence protocol (PLCP) protocol data unit (PPDU) including a physical layer preamble followed by a data field, the data field including a service field that carries a sequence of scrambler initialization bits associated with a synchronization operation of a descrambler of the wireless communication device, at least three bits of the service field carrying bandwidth information indicating a bandwidth associated with the first PPDU, wherein the at least three bits carrying the bandwidth information include two bits of the sequence of scrambler initialization bits and at least one bit of the service field following the sequence of scrambler initialization bits, and wherein the at least one bit is set to a first value and at least one of the two bits of the sequence of scrambler initialization bits is set to a second value different than the first value; and
transmit a second PPDU based on the bandwidth information carried in the service field of the first PPDU.

2. The wireless communication device of claim 1, wherein the at least one bit of the service field carries the bandwidth information based at least in part on a capability of the wireless communication device.

3. The wireless communication device of claim 1, wherein the two bits of the sequence of scrambler initialization bits are located in a sixth and a seventh bit position of the service field and the at least one bit following the sequence of scrambler initialization bits is located in an eighth bit position of the service field.

4. The wireless communication device of claim 2, wherein the at least one bit following the sequence of scrambler initialization bits is set to a value equal to 1.

5. The wireless communication device of claim 2, wherein each of the two bits of the sequence of scrambler initialization bits is set to a value equal to 0.

6. The wireless communication device of claim 2, wherein the service field further includes a second bit, following the sequence of scrambler initialization bits, that carries parity check information associated with at least a portion of the service field.

7. The wireless communication device of claim 1, wherein the bandwidth information indicates that the bandwidth associated with the first PPDU is equal to 320 MHz.

8. The wireless communication device of claim 1, wherein, to transmit the second PPDU, the one or more processor-readable instructions are executable by the one or more processors to cause the wireless communication device to:

transmit the second PPDU responsive to receiving the first PPDU, the second PPDU having a second bandwidth that is less than or equal to the bandwidth associated with the first PPDU.

9. The wireless communication device of claim 1, wherein the first PPDU is a request-to-send (RTS) frame and the second PPDU is a clear-to-send (CTS) frame.

10. The wireless communication device of claim 1, wherein the first PPDU is a clear-to-send (CTS) frame and the second PPDU is a data frame.

11. The wireless communication device of claim 1, wherein a transmitter address (TA) field of the first PPDU includes a first individual/group bit set to a value equal to 1 and a receiver address (RA) field of the first PPDU includes a second individual/group bit set to a value equal to 1.

12. A wireless communication device comprising:
one or more processors;
one or more memories coupled with the one or more processors; and
one or more processor-readable instructions stored in the one or more memories and executable by the one or more processors to cause the wireless communication device to:
transmit a first physical layer convergence protocol (PLCP) protocol data unit (PPDU) including a physical layer preamble followed by a data field, the data field including a service field that carries a sequence of scrambler initialization bits associated with a synchronization operation of a descrambler of the wireless communication device, at least three bits of the service field carrying bandwidth information indicating a bandwidth associated with the first PPDU, wherein the at least three bits carrying the bandwidth information include two bits of the sequence of scrambler initialization bits and at least one bit of the service field following the sequence of scrambler initialization bits, and wherein the at least one bit is set to a first value and at least one of the two bits of the sequence of scrambler initialization bits is set to a second value different than the first value; and
receive a second PPDU having a bandwidth associated with the bandwidth information carried in the service field of the first PPDU.

13. The wireless communication device of claim 12, wherein the at least one bit of the service field carries the bandwidth information based at least in part on a capability of the wireless communication device.

14. The wireless communication device of claim 12, wherein the two bits of the sequence of scrambler initialization bits are located in a sixth and a seventh bit position of the service field and the at least one bit following the sequence of scrambler initialization bits is located in an eighth bit position of the service field.

15. The wireless communication device of claim 12, wherein the at least one bit following the sequence of scrambler initialization bits is set to a value equal to 1.

16. The wireless communication device of claim 12, wherein each of the two bits of the sequence of scrambler initialization bits is set to a value equal to 0.

17. A method for wireless communication by a wireless communication device, comprising:
receiving a first physical layer convergence protocol (PLCP) protocol data unit (PPDU) including a physical layer preamble followed by a data field, the data field including a service field that carries a sequence of scrambler initialization bits associated with a synchronization operation of a descrambler of the wireless communication device, at least three bits of the service field carrying bandwidth information indicating a bandwidth associated with the first PPDU, wherein the at least three bits carrying the bandwidth information include two bits of the sequence of scrambler initialization bits and at least one bit of the service field following the sequence of scrambler initialization bits, and wherein the at least one bit is set to a first value and at least one of the two bits of the sequence of scrambler initialization bits is set to a second value different than the first value; and
transmitting a second PPDU based on the bandwidth information carried in the service field of the first PPDU.

18. The method of claim 17, wherein the at least one bit of the service field carries the bandwidth information based at least in part on a capability of the wireless communication device.

19. The method of claim 17, wherein the two bits of the sequence of scrambler initialization bits are located in a sixth and a seventh bit position of the service field and the at least one bit following the sequence of scrambler initialization bits is located in an eighth bit position of the service field.

20. The method of claim 17, wherein the at least one bit following the sequence of scrambler initialization bits is set to a value equal to 1 and each of the two bits of the sequence of scrambler initialization bits is set to a value equal to 0, the bandwidth information indicating that the bandwidth associated with the first PPDU is equal to 320 MHz.

* * * * *